United States Patent
Olden et al.

(10) Patent No.: US 11,818,114 B2
(45) Date of Patent: Nov. 14, 2023

(54) SYSTEMS, METHODS, AND STORAGE MEDIA FOR SYNCHRONIZING IDENTITY INFORMATION ACROSS IDENTITY DOMAINS IN AN IDENTITY INFRASTRUCTURE

(71) Applicant: Strata Identity, Inc., Niwot, CO (US)

(72) Inventors: Eric Olden, Niwot, CO (US); Christopher Marie, San Juan, OR (US); Carl Eric Leach, Piedmont, CA (US)

(73) Assignee: Strata Identity, Inc., Niwot, CO (US)

( * ) Notice: Subject to any disclaimer, the term of this patent is extended or adjusted under 35 U.S.C. 154(b) by 326 days.

(21) Appl. No.: 17/344,585

(22) Filed: Jun. 10, 2021

(65) Prior Publication Data
US 2021/0392132 A1 Dec. 16, 2021

Related U.S. Application Data

(60) Provisional application No. 63/038,597, filed on Jun. 12, 2020.

(51) Int. Cl.
*H04L 29/06* (2006.01)
*H04L 9/40* (2022.01)
*H04L 67/1095* (2022.01)

(52) U.S. Cl.
CPC ........ *H04L 63/0815* (2013.01); *H04L 63/083* (2013.01); *H04L 63/20* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 8,019,900 B1 * | 9/2011 | Sekar | H04L 67/1095 709/224 |
| 10,037,339 B1 * | 7/2018 | Kleinpeter | G06F 21/10 |
| 10,613,779 B1 * | 4/2020 | Brooks | G06F 3/0604 |
| 10,699,028 B1 * | 6/2020 | Kennedy | G06F 16/9535 |

(Continued)

OTHER PUBLICATIONS

Warren, Jeff et al. Metadata Independent Hashing for Media Identification & P2P Transfer Optimisation. 2012 International Conference on Cyber-Enabled Distributed Computing and Knowledge Discovery. https://ieeexplore.ieee.org/stamp/stamp.jsp?tp=&arnumber=6384945 (Year: 2012).*

(Continued)

*Primary Examiner* — Jeremiah L Avery
(74) *Attorney, Agent, or Firm* — Neugeboren O' Dowd PC

(57) ABSTRACT

Systems, methods, and storage media for synchronizing identity information across identity domains in an identity infrastructure are disclosed. Exemplary implementations may: identify at least one of first identity data and first identity metadata in a first identity domain; identify at least one of second identity data and second identity metadata in a second identity domain; receive a request to change the at least one of the first identity data and the first identity metadata for at least one user; and update the at least one of second identity data and second identity metadata for the at least one user based on the request to change the at least one of the first identity data and the first identity metadata for the at least one user.

20 Claims, 9 Drawing Sheets

(56) References Cited

U.S. PATENT DOCUMENTS

| | | | | |
|---|---|---|---|---|
| 2011/0231363 A1* | 9/2011 | Rathod | ................... | H04L 51/52 |
| | | | | 707/E17.005 |
| 2018/0260125 A1* | 9/2018 | Botes | ...................... | G06F 3/065 |
| 2019/0171650 A1* | 6/2019 | Botev | .................. | G06F 16/2358 |
| 2019/0361792 A1* | 11/2019 | Goldberg | .............. | G06F 16/178 |
| 2020/0117705 A1* | 4/2020 | Hance | ................... | G06F 16/152 |
| 2020/0133786 A1* | 4/2020 | Ramabhadran | ..... | G06F 16/1815 |
| 2020/0145499 A1* | 5/2020 | Kaplan | ............... | G06F 16/9535 |

OTHER PUBLICATIONS

Xu, Shuangshuang et al. A Authentication and Access Authorization Mechanism on the PaaS Platform. 2019 IEEE Symposium Series on Computational Intelligence (SSCI). https://ieeexplore.ieee.org/stamp/stamp.jsp?tp=&arnumber=9002757 (Year: 2019).*

* cited by examiner

SYSTEMS, METHODS, AND STORAGE MEDIA FOR SYNCHRONIZING IDENTITY INFORMATION ACROSS IDENTITY DOMAINS IN AN IDENTITY INFRASTRUCTURE

CLAIM OF PRIORITY UNDER 35 U.S.C. § 119 AND CROSS-REFERENCE TO RELATED APPLICATIONS

The present application for patent claims priority to U.S. Provisional Application No. 63/038,597 entitled "Systems, Methods, and Storage Media for Synchronizing Identity Information Across Identity Domains in an Identity Infrastructure," filed Jun. 12, 2020, and assigned to the assignee hereof, which is hereby expressly incorporated by reference herein. The present application is related to U.S. Provisional Application Ser. Nos. 63/002,921, 63/023,657, and 63/036,497 the contents of which are incorporated herein by reference in their entirety and for all proper purposes.

FIELD OF THE DISCLOSURE

The present disclosure relates to systems, methods, and storage media for synchronizing identity information across identity domains in an identity infrastructure.

BACKGROUND

An identity management system refers to one or more computing platforms implementing a set of technologies used for controlling individual identities, their authentication, authorization, roles and privileges within or across the system and any boundaries associated with the system. Identity management systems are utilized to increase security within the one or more platforms and enterprise boundaries, thereby increasing productivity while decreasing cost, downtime, and repetitive tasks.

Types of functions provided by an identity management system include digital file access control, password management, provisioning of services within the network, enabling single sign-on (SSO), managing security tokens, and mitigating risk, among others. To provide these functions, identity management systems frequently use data (i.e., "identifiers") to identify a subject, credentials comprising evidence to support claims about identities or parts thereof, and attributes comprising characteristics of a subject.

Since many entities utilize multiple third-party providers of cloud services, there is increased fragmentation, layering, and dispersion of identity management within a single organization. This fragmentation, layering, and dispersion of identity management can create a cumbersome system to effectively administer.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below. For the purposes of this disclosure, the term "authentication" may refer to the process of verifying who a user is (i.e., to confirm that users are who they say they are), while the term "authorization" may refer to the process of verifying what a user has access to (e.g., access to a resource, such as an app, a document, a database, etc.).

The state of identity management is challenged because of the increasing fragmentation, layering, and dispersion of identity management systems (also referred to as identity domains). For instance, interested parties often find themselves simultaneously engaged in multiple identity management systems within their identity infrastructure. Different applications and resources are configured to these disparate and incompatible identity management systems. In some cases, this leads to conflicting behavior, security gaps and issues, additional labor and configuration, and extra costs associated with hardware and licensing of multiple domains simultaneously.

Additionally, these applications and resources are often configured and written at a code level to communicate with exactly one identity management system. When business or technology needs necessitate migration to a new system, the application and resource may need to be rewritten. In addition to the substantial costs involved with rewriting the code, it is often not practical since the systems and knowledge utilized to create the original application/resource may be unavailable due to the significant time passage since the application/resource was originally created. This often leads to a brittle setup in which nobody knows the structure and dependencies for the identity infrastructure, and in which any changes or additions introduce significant risk to the organization's security and access rights. Besides the brittle setup of identity infrastructures, current techniques for migrating identity information across multiple identity domains face significant challenges.

One aspect of the present disclosure relates to a system configured for synchronizing identity information across identity domains in an identity infrastructure. The system may include one or more hardware processors configured by machine-readable instructions. In some cases, the processor(s) may be configured to identify at least one of first identity data and first identity metadata in a first identity domain. The processor(s) may be further configured to identify at least one of second identity data and second identity metadata in a second identity domain. In some cases, the processor(s) may be configured to receive a request to change the at least one of first identity data and first identity metadata for at least one user. In some cases, the processor(s) may also be configured to update the at least one of second identity data and second identity metadata for the at least one user, where the updating may be based at least in part on the request to change the at least one of the first identity data and the first identity metadata for the at least one user.

Another aspect of the present disclosure relates to a method for synchronizing identity information across identity domains in an identity infrastructure. The method may include identifying at least one of first identity data and first identity metadata in a first identity domain. The method may include identifying at least one of second identity data and second identity metadata in a second identity domain. The method may include receiving a request to change the at least one of first identity data and first identity metadata for at least one user. The method may include updating the at least one of second identity data and second identity metadata for the at least one user, where the updating may be based at least in part on the request to change the at least one of the first identity data and the first identity metadata for the at least one user.

Yet another aspect of the present disclosure relates to a non-transient computer-readable storage medium having instructions embodied thereon, the instructions being executable by one or more processors to perform a method for synchronizing identity information across identity domains in an identity infrastructure. The method may include identifying at least one of first identity data and first identity metadata in a first identity domain. The method may further include identifying at least one of second identity data and second identity metadata in a second identity domain. In some cases, the method may include receiving a request to change the at least one of first identity data and first identity metadata for at least one user. In some cases, the method may also include updating the at least one of second identity data and second identity metadata for the at least one user, where the updating may be based at least in part on the request to change the at least one of the first identity data and the first identity metadata for the at least one user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
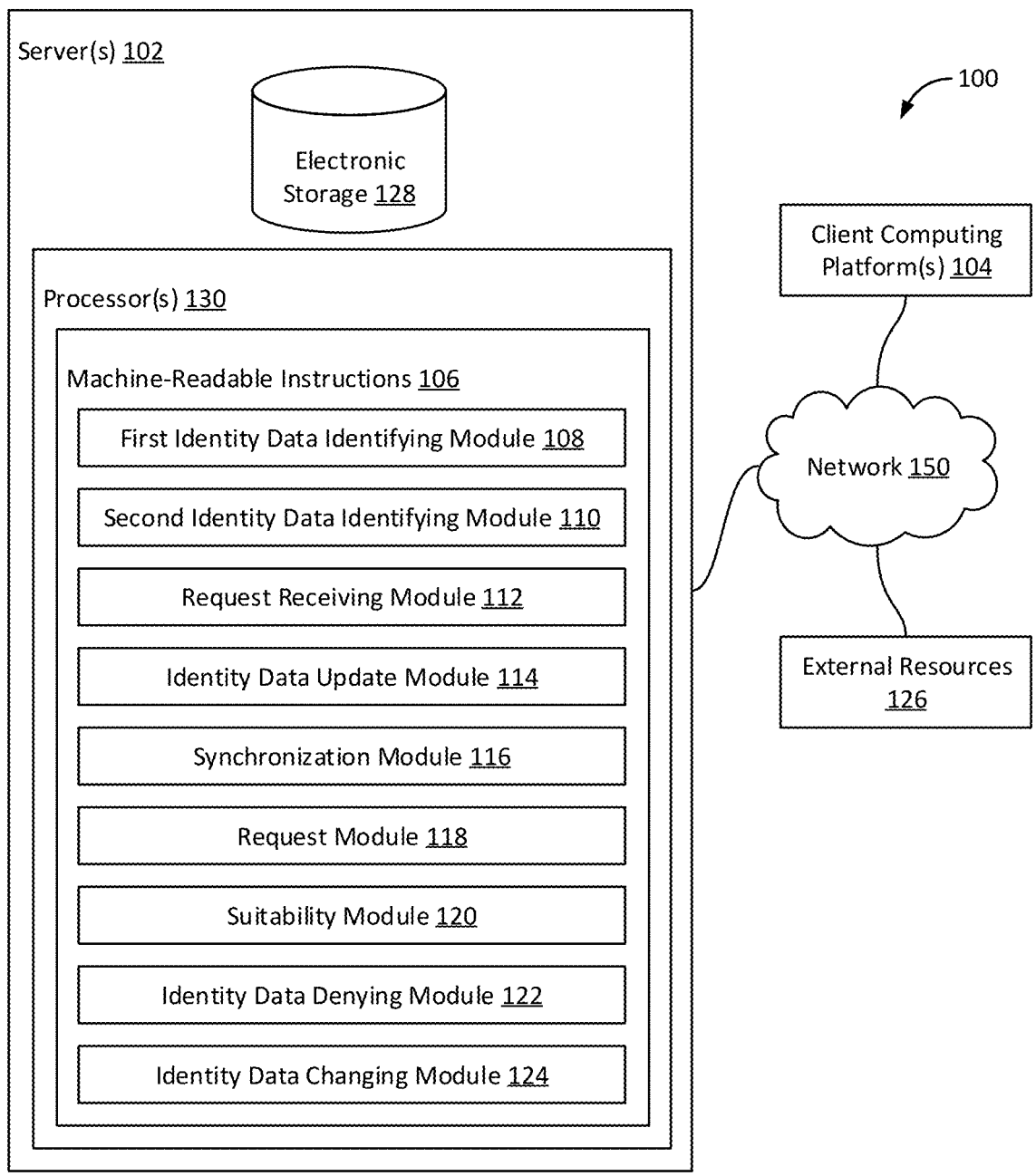
FIG. 1 illustrates a system configured for synchronizing identity information across identity domains in an identity infrastructure, in accordance with one or more implementations.

The words "for example" is used herein to mean "serving as an example, instance, or illustration." Any embodiment described herein as "for example" is not necessarily to be construed as preferred or advantageous over other embodiments.

The flowcharts and block diagrams in the figures illustrate the architecture, functionality, and operation of possible implementations of devices, systems, methods, and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

For the purposes of this disclosure, identity data may refer to individual users' data, including their credentials and attributes. For instance, identity data may include one or more of a user identity (e.g., first and/or last name of a user), a user credential (e.g., username, password, password authentication token, etc., that are bound to the user), and a user attribute (e.g., email address, phone number, residential address, job title, department, employee ID, etc.) for each of one or more individual users of one or more identity domains.

An identity session (also referred to herein as a "session") may refer to an established set of identity data (e.g., identity data accepted by the identity infrastructure to access a resource) that represents a user interacting with the identity infrastructure. In some cases, a session may be established by authenticating a user (e.g., by a user proving their identity through a mechanism such as username and password and/or biometrics, such as fingerprint, iris scan, voice recognition, etc.) and maintaining this session state (e.g., authenticated state) for some established period of time or until the user logs out or their access rights are otherwise suspended. In some cases, a session may refer to a logical construct, for instance, based on a user's identity, that establishes persistence across resource (e.g., file) access and/or page views (e.g., HTTP pages). It is contemplated that a "resource" may also refer to "page views". For example, HTTP is a stateless protocol, which means that when a user requests a particular webpage or resource from a server, and subsequently requests another webpage or resource from the same server, the server treats the user as a new "requestor" each time. In some examples, a session state refers to a feature that allows the identity management system (e.g., shown as system 100 in FIG. 1, system 300-*a* in FIG. 3A) to remember the user by keeping a temporary record of identity data associated with the user. In some cases, each session may be assigned a unique identifier (or session ID) and this session ID may be used to store and retrieve a session state (or an application's working set of data) before and after each page view (e.g., HTTP page view). The application's working set of data may refer to information associated with one or more page views (e.g., items in a shopping cart for an online shopping or e-commerce website). In some cases, the information associated with the session, such as the session ID, may be stored on the server from which the user is requesting the webpage or resource. Additionally, or alternatively, the session ID may be stored on a different computing device such as a user device (e.g., laptop, smartphone, etc.) from which the user is accessing the resource. In some cases, a session may be established by authenticating a user and maintaining a session state for at least a threshold or an established period of time (e.g., 1 minute, 30 seconds, 5 minutes, etc.). In some cases, an identity session may also constitute a set of permissions granted to the user (e.g., for accessing resources, such as protected resources (e.g., resources identified as only allowing certain users to access), in the identity infrastructure) and/or role information associated with the user. In some embodiments, the role information may be different from the user attribute. For instance, multiple users may be associated with the same or similar role information but may have different user attributes. In one example, users having similar designations or seniority levels in an organization (e.g., managers, managing directors, staff engineers, etc.) may be associated with the same or similar role information.

Identity metadata may be used herein to refer to information pertaining to how identity is managed and coordinated. Identity metadata may include password rules, such as, but not limited to password length or a requirement that the password must contain one capital, one number, one symbol and/or cannot be the same as a previous password. Identity metadata may also include authorization policies, such as, but not limited to, a policy which states that user must be in the administrator group to access a resource, a user must be logged in from a US-based IP address, and/or a user may only access resources during business hours (e.g., 9 AM to 5 PM). Additionally, or alternatively, identity metadata may also include a trust policy and network locations (e.g., HTTP address, URL, FTP address, network address, such as an IP address, a MAC address, to name a few non-limiting examples) for identity domain elements of one or more identity domains. The identity metadata may further include one or more of: the enumeration of identity infrastructure elements and their network location and configuration, identity policies such as authorization or authentication rules and mechanisms, and identity session structure and content. Identity sessions may comprise, for example, timestamps for when a session was initiated, the maximum lifetime of a session, how long a session should last for an idle user, an opaque user identifier (e.g., a type of user identifier that does not reveal the user's identity and may comprise a random string or number), a reference to a session identifier (potentially optional, e.g., if maintained centrally), a reference to a requested resource, one or more claims about the user (which may comprise identity attributes), one or more "scopes", and/or an enumeration of privileges the user has for the requested resource. In some examples, sessions may be maintained in browser cookies, Json Objects that are passed between different endpoints, server caches, or databases. In some cases, scopes may be used to define the specific actions that are permitted to be performed on behalf of a user, an application, etc. When a user agent (e.g., web browser) requests permission to access a protected resource or application through an authorization server (e.g., shown as access system 423 in FIG. 4), a scope parameter may be provided to specify what access is needed and the authorization server may use the scope parameter to respond with the access that is actually granted (e.g., the granted access may be different from what was requested). In some examples, this process may comprise the authorization server generating an access token comprising one or more scopes based on evaluating the user authentication data and/or scope parameters. In some cases, the access token comprises a string of random characters that enables the protected resource to verify incoming requests may be granted access to the protected resource. For instance, the access token may be based in part on the username/password credentials received from the user during login. In some cases, the access token serves as a key comprising a collection of metadata (e.g., information pertaining to an authorization policy for the user).

An identity domain refers to a computing system for managing one or more of users and roles, integration standards or identity standards, external identities (i.e., identities with no relation or presence in the identity domain, such as identities associated with another identity domain), and secure application integration using, for instance, an authentication scheme (e.g., Single Sign-On (SSO)) and/or an authorization protocol (e.g., a set of rules that allows a third-party website or application to access a user's data without the user needing to share login credentials). Application integration, as used herein, refers to a mechanism for supporting interactions between an application or protected resource associated with a first identity domain and users associated with a second different identity domain. As an example, an enterprise may have developed an app for its customer or enterprise partner, where the app may be secured by a first identity domain. Further, the enterprise partner may already manage one or more identities on other identity domains, such as a second identity domain. In such cases, the enterprise may integrate their app with the second identity domain, which may allow users associated with the second identity domain to seamlessly interact with their app without creating another identity (e.g., in the first identity domain) to access the app. In some cases, integration of identities and applications may be performed using one of numerous methods, such as manual identity administration (e.g., manually adding users from the second identity domain into the first identity domain), bring your identity solutions (e.g., allowing users to sign in their Google or Microsoft credentials, provided by Alphabet, Inc., of Mountain View, CA, and Microsoft Corp., of Redmond, WA, respectively), and federation (e.g., enterprise and customer/enterprise partner mutually agree to allow the enterprise partner users to use their own identities to access the app provided by the enterprise). In some cases, identity federation may comprise enforcing common identity standards and protocols to coordinate and manage user identities between different identity providers or identity domains, applications, etc., across an identity infrastructure.

There exist numerous identity and access management (IAM) standards (also referred to as integration standards) for managing access. In some cases, these IAM standards are "open" standards, that is, they are publicly available and associated with one or more rights to use. In some cases, these IAM standards are integrated (e.g., unified) and used across a plurality of applications, devices, and/or users. Some non-limiting examples of IAM standards include Security Assertion Markup Language (SAML) used to send authorization messages between trusted partners or entities, OpenID, Web Services Trust (WS-Trust), WS-Federation, and OAuth. SAML defines an XML framework for exchanging security assertions among security authorities and may facilitate interoperability across different vendor platforms that provide authentication and/or authorization services. In some circumstances, OAuth may enable a user's account information to be used by third-party services, such as Facebook provided by Facebook, Inc., of Menlo Park, CA without exposing the user's password. In some examples, an identity domain controls the authentication and authorization of the users who can sign into a service (e.g., a cloud service), and what features they can access in relation to the service. For example, a cloud service (e.g., Database Cloud Service and Infrastructure as a Service (IaaS)) may be associated with an identity domain. Multiple services may be associated with a single identity domain to share user definitions and authentication rules, for instance. In some cases, users associated with an identity domain may be granted different levels of access (or authorization) to each service (e.g., cloud service) associated with the identity domain. For instance, a first user (e.g., a system administrator) may be provided both read and write access, while another user (e.g., accountant) may only be provided read access. Thus, in some aspects, an identity domain is a self-contained realm with consistent identity data and identity metadata throughout. Some non-limiting examples of an identity domain include an Active Directory (AD) domain or an Okta account for a single company. It should be noted that other identity domains may be contemplated in different embodiments known in the art.

In some cases, one or more connecting agents may communicate identity data and/or identity metadata across identity domain boundaries (i.e., between disparate identity domains), as further described in relation to FIG. 6. Communication across identity domain boundaries may be facilitated by the transformation of the data between different formats (e.g., Kerberos, OAuth/OpenID Connect, Username/Password, Header-based, HTTP Basic Authentication, HTTP Digest Authentication, and Cookie-based, to name a few). Additionally or alternatively, communication across identity domain boundaries may involve mapping of data elements for each domain (e.g., Domain 1 includes the elements street number, city, zip code; and Domain 2 includes street name, city, state, country, zone), communication of implicit/explicit policy information (e.g., Security Assertion Markup Language (SAML) communicating group membership, which may then be used to evaluate associated policies or geographic information about the originating request), and establishing and acting upon the trust mechanisms required for said communication. For instance, connecting agents may manage trust relationships of multiple identity domains and their associated protected resources. A trust relationship refers to a logical link established between two entities (e.g., a user and an identity domain, two identity domains, etc.), where one of the entities may be referred to as a trusting domain (e.g., a first identity domain) while the other may be referred to as a trusted domain (e.g., a second identity domain). When a trust relationship is in place, the trusting domain may honor, for instance, a login authentication associated with the trusted domain.

In some circumstances, trust relationships may be necessary for identity sessions to be accepted by the protected resource. Trust relationships may be a way to establish the validity of identity sessions and prevent spoofing of a session. In some cases, trust relationships may be established via a signature generated from a private key and validated using an associated public key. Public key cryptography (also known as asymmetric cryptography) refers to an encryption technique where two parties (e.g., a user and an identity domain, a user and a protected resource) may each be assigned two keys—a public key and a private key. Numerous cryptographic tools and modules exist for generating public/private key pairs. One non-limiting example of such a tool is OpenSSL provided by TheOpenSSL Project. OpenSSL is an open-source command line tool that is used for TLS and Secure Socket Layer (SSL) protocols and may be used to generate public/private keys, install SSL/TLS certificates, and identity certificate information. Other types of commercial and/or open-source tools for generating public and private keys are contemplated in different embodiments. In some cases, the two keys for a respective party may be connected and may comprise two large prime numbers (e.g., 100 digits long, 150 digits long, etc.) with certain mathematical properties. For instance, two random n-bit (e.g., 512 bit, 1024 bit, etc.) prime numbers may be generated and multiplied together to create a modulus (N), where the value N is part of the public and private key. The public key may be shareable and may allow a receiving entity to receive messages from other entities. Further, the receiving entity may decrypt the message or dataflow using their private key. In such cases, a receiving entity may decode a message or dataflow encoded by a transmitting entity (i.e., using the receiving entity's public key) by using their private key (i.e., the receiving entity's private key). In some cases, a user may be authenticated using their login credentials and a trusted third party (e.g., a Certification Authority (CA)) may prove a link between the public key of the user and the user's identity. For instance, the CA may be associated with a public key and a private key and may sign a certificate using their private key. The identity domain or protected resource may use the public key associated with the CA to determine the user's public key (e.g., embedded within the certificate) and verify the user (i.e., confirm the user's identity by verifying who they say they are). In some cases, any entity (e.g., protected resource, another user, etc.) with the public key associated with the CA may decrypt the certificate to identify the user's public key.

In some cases, public/private key pairs may also be used to decrypt and verify assertions between different identity domain and/or identity infrastructure elements. Each receiving entity possessing a public key associated with a transmitting entity may be able to read (e.g., decrypt) a message that has been signed using a corresponding private key of the transmitting entity and confirm that the original contents of the message have not been altered, for instance. Or, in one non-limiting example, an identity domain element may use its private key to sign a cookie associated with an identity session. In such cases, one or more protected resources or applications that trust and rely on the cookie to grant user access to the protected resource may utilize the public key in the identity session to decrypt and verify the signature, thereby enabling access to the protected resource.

In other cases, trust relationships may involve Transport Layer Security (TLS) combined with a Domain Name System (DNS) to confirm that traffic is routed to the expected element and not subject to interception by a rogue party (e.g., Man-in-the-middle attack). As an example, two servers may connect together over a network and communicate with each other, where their communications may be secured using TLS. In some cases, TLS may involve the use of a specific protocol to enable the servers to establish their identity with each other. Similarly, communication(s) between an identity domain, enforcing agent, and/or protected resource may be secured using TLS. In some cases, a DNS routing a request to a host (e.g., a first server) may issue a certificate to the requesting party (e.g., a second server, a user agent, etc.) to prove that the DNS routed the request to the correct host. In some cases, the certificate may be signed using a private key associated with the DNS and may comprise a public key associated with the host server. The requesting party may decrypt the certificate (e.g., using the public key associated with the DNS) and retrieve the public key of the host embedded within the certificate, which may allow the requesting party to confirm that the request was routed to the expected element. In other cases, the host server may issue a certificate and sign it using their private key. The DNS or the host may further relay the certificate to the requesting party. After decryption, the requesting party may confirm the identity of the host that received their request.

In some examples, an orchestrating agent may direct flow of identity data through the identity infrastructure. In some cases, an orchestrating agent may work in conjunction with a connecting agent or may act as a connecting agent itself and may perform the data transformations and other connecting behaviors. In some embodiments, orchestrating agents may be installed and placed as proxies and orchestrators within the flow of identity data (e.g., authentication and authorization requests, managing users, setting and reading user attributes) and identity metadata (e.g., setting, editing, and reading access policies, password rules, data locations, rules controlling user administration tasks and the hierarchy delegation of those tasks, rules for assigning user memberships in groups, roles, etc., and rules or policies to determine the assignment of accounts to users) of the existing system or identity infrastructure.

Lastly, a protected resource may refer to an element or application of the identity infrastructure that is configured to assess or evaluate the identity data (e.g., information provided by a user to access the protected resource such as, but not limited to, a username, password, user attribute, unique identifier, unique pin, and biometric information such as, but not limited to a fingerprint, iris scan, and voice input, and other information known in the art) in order to make access and control decisions about its resources and/or data. In other words, a protected resource may be aware about the identity data needed to access it. In some circumstances, the protected resource may use the identity session and/or the identity data in deciding to allow access to its data. In some embodiments, the protected resource may only allow restricted or partial access based on evaluating the identity data. As an example, a protected resource may expect a header or a cookie for access to the protected resource, while another protected resource may merely grant access upon a user arriving at that protected resource. Thus, each protected resource may be aware of the mechanism by which it may be provided an identity session by its associated identity domain. In some aspects, the protected resources are coupled to the identity domain based on their reliance on identity session(s) and their particular formats and security constraints (i.e., identity data and/or identity metadata formats and constraints).

In some cases, the header/cookie may be passed in a token, such as an authentication token or an access token. In some cases, the authentication token may be generated and assigned to a user once the user is authenticated. Further, a certificate (e.g., a Public Key Infrastructure (PKI) certificate, such as a Secure Socket Layer (SSL) certificate) linked to the authentication token and representing a valid identity session may be issued to the user. In some cases, the certificate may be issued by a third party, such as a Certification Authority (CA) and may include the user's public key, a name, and any other applicable information. The certificate may serve as an attestation by the CA that the user is who they claim to be. For instance, the CA may sign a data structure that contains the user's public key and name, thus binding the user's public key to their name. Further, the certificate may be encrypted by the CA. The CA may also be linked to a private key and a public key, and may encrypt the certificate with a combination of the public and private keys associated with the CA. Any entity (e.g., protected resource, another user, another identity domain, etc.) with access to the CA's public key may verify the certificate (i.e., that the certificate is issued by a trusted CA) and/or the claim made in the certificate (i.e., the user is associated with the user's public key). The user may utilize this certificate for interactions with the protected resource, for instance. In some cases, authorization may comprise using attribute information associated with the token issued to the user during authentication and comparing said information to access control rules for the protected resource. If the rule permits the user to access the protected resource, the authorization is successful, and the user is granted access to the protected resource. In some other cases, access tokens may be utilized, for instance, if an identity domain or protected resource does not support the use of certificates and authentication tokens. In such cases, an access token may be issued by a server, such as an authorization server once the user identity data, access control rules, etc., is verified. In other words, the access token may serve as a proof that the user is authorized for access. This access token may be sent in an authorization header, such as an HTTP authorization header, and may be used to establish user identity and authorization. In some cases, the protected resource or identity domain may validate the token, for instance, via a call to one or more of the authentication and authorization server, or using a public key corresponding to a private key with which the authentication and/or authorization server signed the access token. Alternatively, in some circumstances, anyone (e.g., authorized user, rogue user) holding the access token may gain access to the protected resource. To alleviate such issues, communication of the access token may be secured via Transport Layer Security (TLS). Centralized validation of access tokens may also mitigate the chances of a rogue user gaining access to a protected resource (i.e., man in the middle attack). Some non-limiting examples of tokens (e.g., access tokens, authentication tokens) may comprise bearer tokens, hash-based authentication code (HMAC) tokens, and RSA-SHA1 tokens using RSA private/public keypairs. In some cases, a token may comprise one or more of unique string values, hashed values, a cryptographic hash function and a secret cryptographic key, attributes information, etc., issued by a server, such as an authentication server.

The identity infrastructure may include one or more identity domains and one or more identity infrastructure elements. The one or more identity domains may further comprise one or more identity domain elements, where the one or more identity domain elements may comprise hardware (e.g., servers, computing devices or platforms, etc.), software (e.g., a cloud service), or a combination thereof. By way of non-limiting example, the one or more infrastructure elements installed in the identity infrastructure may include one or more of servers, routers, identity stores comprising one or more databases of authentication information, policy enforcement points for enforcing authorization rules (e.g., shown as access system 423 in FIG. 4), authentication points for determining user identity (e.g., shown as authenticate system 421 in FIG. 4), proxy devices, policy decision points for evaluating authorization rules based at least in part on identity session attributes, and protected resources (e.g., applications or apps). In some examples, a policy decision point (PDP) is a system entity or component of a policy-based access control system configured to make authorization decisions for itself or alternatively, for other system entities that request such decisions. For instance, a PDP may determine whether or not to authorize a user's request based on available information (e.g., attributes, such as identity session attributes) and/or applicable security policies. In some cases, a PDP may examine a request to access a resource (e.g., an application or app, such as a mobile app, web-based app, etc.) and compare said request to the policy that applies to requests for accessing that resource (i.e., to determine whether the requestor, such as a user, should be granted access). Additionally or alternatively, the identity infrastructure may comprise at least one authorizing agent, also referred to as an enforcing agent, for interpreting identity session information and evaluating access rules. In other words, the authorizing or enforcing agent may enforce access control for protected resources in the identity infrastructure. In some embodiments, the identity session and identity data may be associated with the session information. Further, the authorizing or enforcing agents may be realized using hardware, firmware, software or a combination thereof.

In some cases, an identity domain may refer to a construct for managing one or more of users and roles, integration standards, external identities, and secure application integration through single sign-on configuration. In some aspects, an identity domain may control the authentication and authorization of users who can sign into a service, and the features they can access in relation to the service. In some examples, the service may be a cloud service. In other cases, the service may be an on-premises service. In some circumstances, the identity infrastructure for an enterprise may comprise multiple identity domains, and each identity domain may comprise multiple services. In other words, users of different identity domains may be granted access to different services, applications, resources, etc., based on the services associated with each identity domain. Furthermore, users in an identity domain may also be granted different levels of access to each service associated with the identity domain.

Migration of Identity Information

In some cases, a user from a first identity domain may be migrated into another identity domain, such as a second identity domain. As an example, a business acquisition may bring in new identity domains, systems, user identity stores, etc., which may need to be connected to corporate resources. In this case, the user from the first identity domain may be referred to as an unmigrated user in the second identity domain since there is no user profile for that user in the second identity domain. In order to provide the user access to resources or services associated with the second identity domain, the user may need to be migrated into the second identity domain. In some embodiments, the system of the present disclosure (e.g., shown as system 100 in FIG. 1, system 300-*a* in FIG. 3A) may support migration of both live and non-live credentials. Live migration may refer to migration occurring during an active session where an active session may refer to a state when identity data or metadata such as, but not limited to, one or more of a user identifier and user credentials information for a user in a first identity domain, has been verified. Such verification may be in response to receiving a login request from the user and the user identifier and user credentials information associated with that user. In some cases, live migration may allow for user credentials to be inserted into other identity domains in the identity infrastructure. In such cases, credentials may not be encrypted, and may be referred to as readable credentials. In some cases, credentials may include a combination of a user identifier and a password. Further, passwords may be one-way hashed for security reasons, which may also increase the complexity of migrating credentials in a non-live manner across different identity systems or domains. In some cases, non-live credentials may also be referred to as encrypted, hashed, or non-reversible credentials. A one-way hash function refers to a mathematical function that generates a unique binary sequence (or hash) of the input. If the input is the same, then the hash is the same. Further, if the input changes (e.g., even by one character) the output hash may be completely different. To authenticate the user, the hashed credentials may be compared to a hashed copy stored, for instance, in an attributes system (e.g., shown as attributes system 426 in FIG. 4), authenticate system (e.g., shown as authenticate system 421 in FIG. 4), etc., within the identity domain. The unique binary sequence or hash is computationally difficult to invert (i.e., to generate the original input from the hash). In some circumstances, after user credentials have been one-way hashed, it may be difficult to invert or "unhash" them so they can be inserted into another identity domain.

In some cases, live migration may also allow for credentials upgrade. In one non-limiting example, updating the credentials may comprise prompting for additional factors during the authentication process. One such prompt may comprise a request for multi-factor authentication. Some non-limiting examples of additional factors include physical tokens (e.g., a key or dongle that connects to a user's mobile device using USB, Bluetooth, Near Field Communication (NFC), etc.), PIN generator devices displaying rotating codes that a user enters to complete authentication (e.g., RSA SecurID), a mobile device with cryptographic keys or certificates installed on the device, a mobile device with a mobile authenticator application that uses a Time-based One-time Password (TOTP) algorithm that generates codes (e.g., a 4 digit code, 6 digit code, etc.) entered by the user to complete authentication, a mobile device configured to receive push notifications for verifying authentication events, and/or smart cards with embedded certificates.

In some cases, live migration may also allow for credentials modification, for instance, to suit requirements in another identity domain (e.g., a second identity domain). In some embodiments, different identity domains may have different password composition and complexity rules. As an example, a first identity domain or source identity system may require passwords to be a minimum of 8 characters in length, have at least one lowercase letter, and a number. Further, a second identity domain or destination identity system may require passwords to be at least 12 characters in length, and include at least: one uppercase letter, and one special character (e.g., $, @, &, %, etc.). In such cases, an unmigrated user (i.e., unmigrated in the second identity domain) attempting to access services, applications, resources, etc., associated with the second identity domain may be prompted to select a password that complies with credentials rules in both the first and the second identity domain. In this example, the unmigrated user may select a password (e.g., BestPassword007$) that is at least 12 characters in length and comprises one lowercase letter, one uppercase letter, a number, and a special character to comply with the password rules of both the first and the second identity domain. After migration, the user may be authenticated using the modified credentials information entered into the second identity domain, for instance, while attempting to access services, applications, resources, etc., associated with the first identity domain. Alternatively, the user may be authenticated using the modified credentials information while attempting to access protected resources or apps associated with the second identity domain. As used herein, a source identity system may refer to an identity system or identity domain which a user is to be migrated from and into another identity domain (referred to as the destination identity system or domain).

In some embodiments, live migration may also allow the system to interact with a user for additional information. For instance, a user may be prompted to input additional identifying information, such as their current address, address history for the last 5 years, etc. Furthermore, the system 100, 300-*a* may also request user consent to perform follow up actions or prompt the user to accept terms and conditions before proceeding with the migration, to name a few non-limiting examples.

In some embodiments, users and/or their credentials may be validated or checked for compromise prior to live migration. Compromised credentials may be maintained and stored in a database (e.g., compromised accounts database 590 in FIG. 5) and may be updated after a data breach. By checking if a user's credentials have been compromised in a source identity domain (i.e., before migration), the system may also thwart the compromised user's credentials from affecting other identity domains. In such cases, after determining that an unmigrated user's credentials have been compromised in the source identity domain, the system may force the user to update or change their credentials in order to proceed with migration to another identity domain. It should be noted that, regardless of migration, a user may be notified or prompted to update their credentials once a data breach and credentials compromise has been established. In some circumstances, user data/credentials may be validated for compromise by external third parties. For instance, an external third party may maintain a database of credentials, such as compromised accounts database 590 in FIG. 5, known to have been compromised in previous data breaches. In some cases, an external third party may also maintain or support an API, which may allow the system to send identifying information about users to the API in order to validate or check if the identifying information matches with compromised credentials stored in the database. If the external third party (or the API maintained by the third party) returns a match, the system may prompt the user to modify their credentials.

In some cases, one or more migration agents may be inserted or installed in an identity infrastructure. Migration agents may be realized using hardware, firmware, software or a combination thereof. In some cases, a migration agent (e.g., shown as migrating agent 578 in FIG. 5) may be inserted into the dataflow between the user and an identity domain. For instance, a migrating or migration agent 578 may be installed in a web application or a web browser, where the migration agent may intercept the web traffic, identify an attempt to change identity data, and respond with one or more prompts (optional) to the user. For example, the migration agent may prompt the user if a received password does not comply with credentials rules in the second identity domain, as discussed above. In other cases, the migration agent may proxy login traffic, detect a login for a user in a first domain (or a source identity system), determine whether the user is an unmigrated user in a second identity domain (or destination identity system), and provide the necessary prompts to migrate the user to the second domain.

In some embodiments, the migration agent may utilize the user id and credentials received during the login request to query the source identity system for the user's profile data to, for example, move user identities from the source identity system (e.g., an on-premises identity system or domain) to the destination identity system (e.g., a cloud-based identity domain).

The migration agent may also query the destination identity system to check whether a matching user already exists. If not, the migration agent may tag the user as an unmigrated user in the second identity domain. Upon determining that the user is unmigrated in the second identity domain, the migration agent or another agent in the system may check the user credentials for compromise and prompt the user to modify their credentials to comply with credentials rules or policies associated with the second identity domain. In some embodiments, the system may also prompt the user to set up multi-factor authentication (i.e., additional credentials) for the second identity domain. In some examples, the system may use the updated credentials to create a new user profile for the user in the second identity domain, which may allow the user to access services and resources associated with the second identity domain. In some cases, the migration agent may also query the source identity system (i.e., first identity domain) for the user profile data stored for each user, for instance, to move user identities from the source identity system (e.g., an on-premises identity system or domain) to the destination identity system (e.g., a cloud-based identity domain). In some cases, the user identities or profile data associated with the on-premises identity system may be replicated and used to create user profiles in the destination identity system. Profile data may include one or more of a first name, a last name, email address, alternate email address, phone number, alternate phone number, address, zip code, last 4 digits of Social Security Number (SSN), etc. In some circumstances, profile data may be stored as attributes in a user's record or entry in an identity domain.

Additionally, or alternatively, the migration agent may also evaluate compatibility of user data in the first identity domain with a schema used to store user data in the second identity domain. The schema used to store data may be defined by a data store being used for the second identity domain, where the data store may comprise a Lightweight Directory Access Protocol (LDAP) directory (e.g., shown as LDAP 533-*b* in FIG. 5), a relational database, etc. The schema may define the attributes required for each user entry, value formats for the attributes, mandatory attribute values, and other rules related to the structure and types of data allowed by the data store. Thus, in some aspects, the system of the present disclosure is configured to accommodate the rules that govern how user data is defined and stored for different identity domains.

In some embodiments, migration agents may also evaluate the suitability of changes or updates in the first identity domain with respect to data sovereignty and regulations (e.g., General Data Protection Regulation (GDPR) in European Union (EU) law) applicable in the second identity domain. It should be noted that, while the present disclosure generally describes one source identity system and one destination identity system, the number of destination identity systems is not intended to be limiting. In other words, different numbers of destination identity domains (e.g., 2, 3, 6 etc.) may be contemplated in different embodiments, as further described in relation to FIG. 6.

In some cases, identity domains (i.e., both original and subsequent identity domains) may have divergent abilities to interpret and enforce identity metadata. For example, an original identity domain may support the expression of an authorization rule that is inexpressible in subsequent identity domains. In such cases, the identity infrastructure or the system (e.g., system 100 in FIG. 1, system 300-*a* in FIG. 3A) may comprise orchestrating agents that allow for the interpretation and enforcement of said authorization rules. In one example, administrators of an Active Directory Identity Domain may be able to generate policy rules stating nobody may log in after 9 PM. However, an OKTA Identity Domain may not support expressing or enforcing time-based rules. In this case, the orchestrating agent may interpret and enforce the time-based rules in the OKTA Identity Domain.

Synchronization

In some cases, identity data and/or identity metadata for a user in a first identity domain may be modified or changed. A password update by a user in the first identity domain may be an example of such a change. Further, these changes may be propagated to a second identity domain, for instance, to allow a user to seamlessly access resources associated with the second identity domain. In some examples, synchronization may refer to the process of detecting changes to identity data and/or identity metadata in a first domain and applying those same changes to a second identity domain. Furthermore, synchronization in an identity infrastructure may also include enforcement of rules (e.g., time-based access rules) associated with the second identity domain.

Figure 3A:
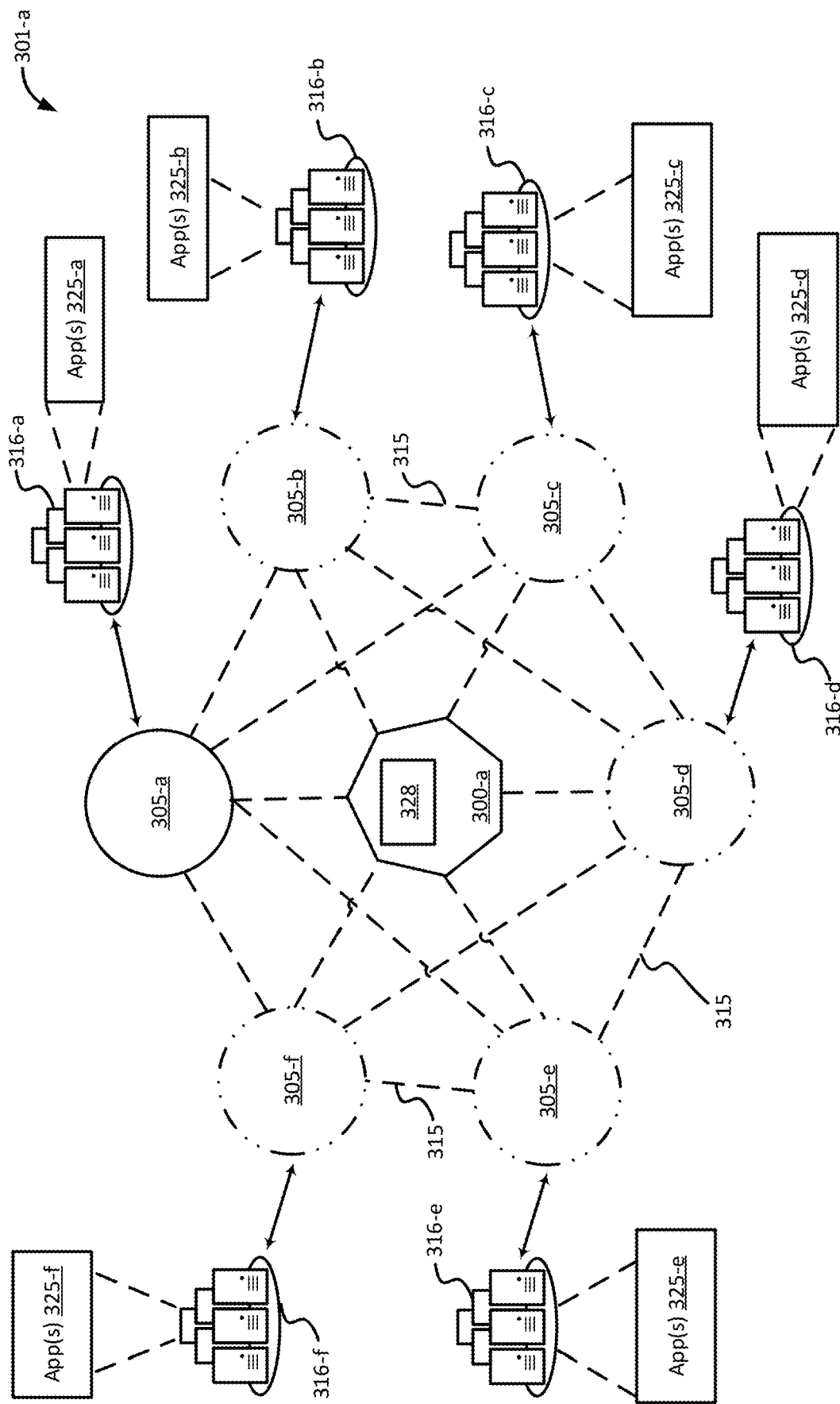
FIG. 3A illustrates a distributed identity management environment comprising the system of FIG. 1, according to an embodiment of the disclosure.
Figure 6A:
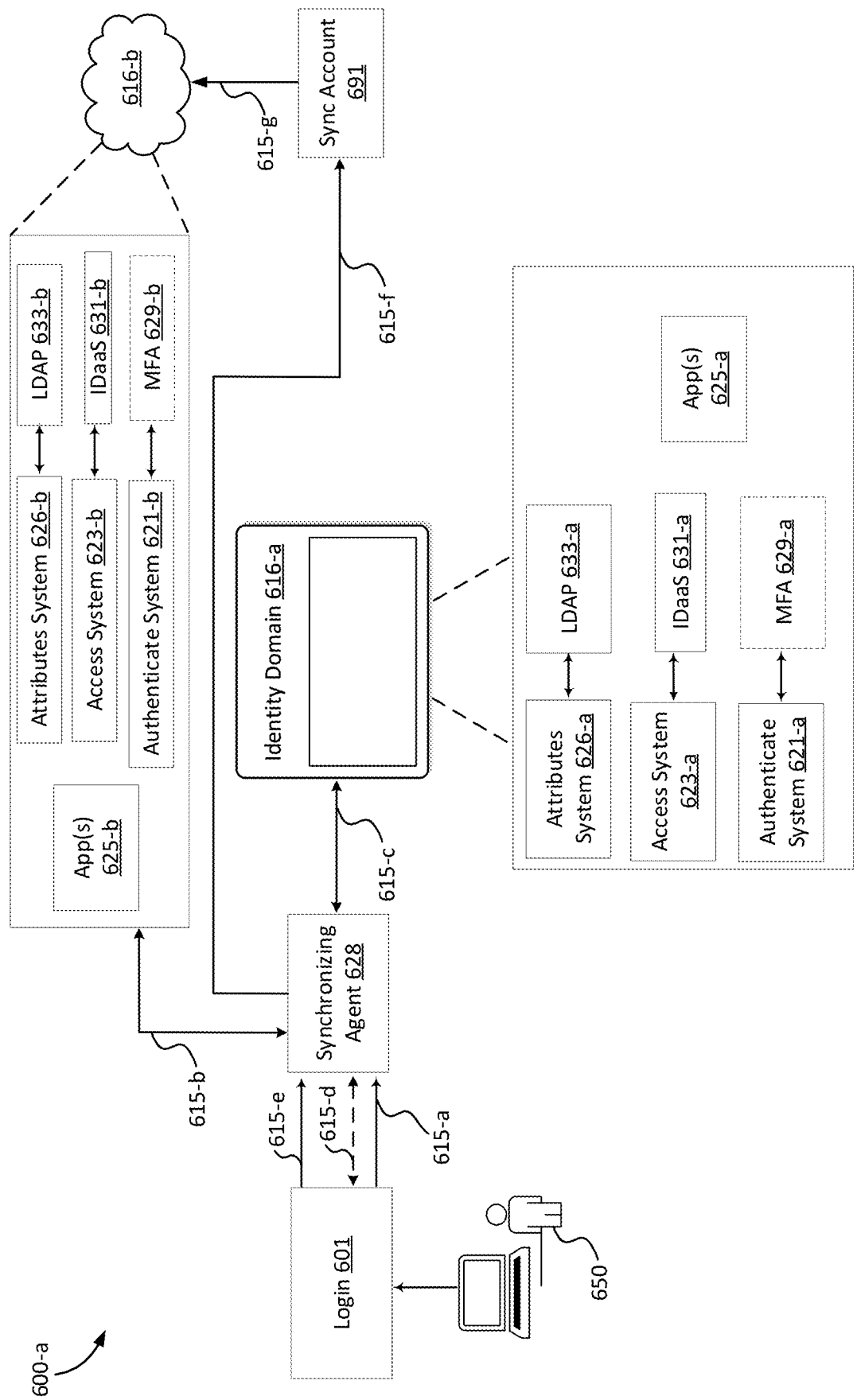
FIG. 6A illustrates a process flow for synchronizing identity across multiple identity domains, according to an embodiment of the disclosure.

In some embodiments, an identity infrastructure may comprise one or more synchronizing agents (e.g., shown as module 328 in FIG. 3A, synchronizing agent 628 in FIG. 6A).

Synchronizing agents may be realized using hardware, firmware, software or a combination thereof. In some cases, synchronizing agents may be configured to intercept requests to change identity data and/or identity metadata, process one or more of the identity data and identity metadata, and identify one or more modifications in one or more of the identity data and identity metadata. It should be noted that the identity data and identity metadata may be associated with a first identity domain (e.g., shown as first identity domain 616-*a* in FIG. 6A). Furthermore, synchronizing agents may also be configured to evaluate a compatibility of the identified modifications with respect to a different identity domain, such as a second identity domain (e.g., shown as second identity domain 616-*b* in FIG. 6A).

In some examples, synchronization of live credentials and/or non-live credentials in an identity infrastructure may be supported. In some cases, credentials may include a combination of a user identifier and a password. Further, passwords may be one-way hashed for security reasons. Live credentials synchronization may refer to the migration of a user's credential during an active session. In such cases, credentials may not be encrypted, and may be referred to as readable credentials. In some other cases, synchronization of non-live credentials may refer to migration of encrypted credentials. Encrypted credentials may also be referred to as non-live, hashed, or non-reversible credentials.

In some cases, one or more events may cause identity domains to become unsynchronized. Such events may include, but not limited to, interactions that alter identity data or identity metadata, such as adding or deleting users, altering user attributes, altering user credentials, altering access policy rules, etc. In such cases, migration agents or synchronizing agents may be utilized for live prevention or alteration of events that could cause identity domains to become unsynchronized. For instance, migration agents or synchronizing agents may be configured to interact with the user (e.g., send an alert to the user) to rectify breaking changes and ensure changes are compatible in the second identity domain. As an example, if a user is attempting to change their password in the first identity domain, a migration agent or synchronizing agent may evaluate a compatibility of the new password with respect to password rules in the second domain. In this example, if the new password is too short for a second identity domain, the migration agent or synchronizing agent may alert the user to the incompatibility of the new password in the second identity domain and request the user to input a longer password.

In some circumstances, two or more identity domains may not synchronize or cooperate with each other. For instance, in current techniques, identity domains may limit synchronization to the exchange of information required for single sign on using protocols such as Security Assertion Markup Language (SAML), OAuth, or OpenID Connect, etc. In some other cases, identity domains may provide capabilities for migrating users from one identity domain to another using a protocol such as System for Cross-domain Identity Management (SCIM). SCIM refers to an open standard for managing user identity information and provides a defined schema for representing users and groups. SCIM refers to an Internet Engineering Task Force (IETF) standard for defining users and/or groups using a standardized, fixed schema. The SCIM standard may support integration between an application and an identity provider, such as Okta, for instance, for creating, updating, or removing users from an application secured by the identity provider.

In some cases, SCIM may be used to create users and/or groups in a variety of cross-identity domain environments. In some circumstances, however, SCIM is limited with regards to the level/granularity of policy control it allows. For example, SCIM may only allow readOnly or readWrite on a portion of user or group attributes associated with an identity domain. In other cases, SCIM may not address (e.g., via policy) a way of determining, for example, how long a user should have an account (i.e., user profile or record in an identity domain), or be a member of a group. In yet other cases, SCIM implementations may be inconsistent, for instance, when one implementor (e.g., first administrator) implements only mandatory parts of the SCIM specification in a first identity domain, while another implementor (e.g., second administrator) implements mandatory parts, as well as some optional parts of the SCIM specification in a second identity domain. Oftentimes, this results in inconsistency of user identity management across those two identity domains. In other words, SCIM's ability to update user attributes and support cross-identity domain management is limited in several regards, making it an inadequate choice for synchronizing updates of identity information across multiple identity domains.

As seen, such protocols (e.g., SCIM) may not support keeping user data, sessions, access policies, and configurations in sync. In such cases, custom tools may be utilized for non-live synchronization or non-live migration, which may involve offline, bulk processes. However, neither of the identity domains may be taken offline during non-live migration. For example, custom tools that implement bulk process migration may run "offline" in the sense that they pull or retrieve data from a data store (e.g., LDAP), temporarily store the data (e.g., by creating a static, interim file; storing in cache memory, etc.), manually manipulate the data to match the format of the target or destination identity domain, and load the data using batch processes. However, custom tools are inefficient—besides the significant amount of time taken, batch loading may provide for low data fidelity and/or may be prone to errors. Furthermore, custom tools often have to operate point-point since they may only be capable of dealing/interacting with a single source identity system/domain and a single destination identity system/domain. Custom tools may also fail to support the collection of identity data and/or identity metadata from multiple, distributed, identity stores associated with multiple identity domains. Given the above, by the time such bulk processes are completed by the custom tools, data may already be out of sync.

According to the present disclosure, synchronization may be incorporated into a live process via the use of synchronizing and/or migration agents. In some cases, live synchronization may allow a broader variety of data to be handled, as compared to the current techniques. For instance, when passwords are migrated during offline, bulk processes as described above, the passwords may have already been one-way hashed. In such cases, the target identity domain may have no feasible way of enforcing its own password policies on that hashed value. In some cases, the password may also not meet the more stringent criteria of the target identity domain, which may cause user login failures. Live migration/synchronization of identity information may mitigate the chances of login failures, by ensuring the identity data (e.g., password) conforms to the requirements of both the source and target identity domain. In another example, compound user attributes may be constructed from user attributes in multiple identity domains, for example, to create user attribute(s) that conform to the syntax/format of the target identity domain. As an example, a user attribute in the target identity system/domain may require prefix and suffix values to be combined into a single attribute (e.g., foo @bar), where the prefix and suffix values only exist in different identity domains (i.e., different source identity domains). Unlike conventional techniques, aspects of the present disclosure enable migration and/or synchronizing agents to interact with multiple source and/or destination identity domains, making the construction of compound user attributes feasible. Furthermore, live migration/synchronization may allow identity data/identity metadata to be collected and moved "just in time" in small increments to the destination identity domain(s), which may alleviate the risk of migrating/synchronizing using outdated (out of sync) data.

In some embodiments, synchronizing agents or migration agents may also be used to evaluate suitability of the requested changes in the first identity domain with respect to data sovereignty and regulations (e.g., General Data Protection Regulation (GDPR) in European Union (EU) law) applicable in the second identity domain. It should be noted that, while the present application generally describes synchronization of identity data and identity metadata between two identity domains, the number of identity domains is not intended to be limiting. In other words, different numbers of identity domains (e.g., 3, 4, 6, etc.) involving '1 to 1' or '1 to many' or even 'many to 1' compatibility evaluations may be contemplated in other embodiments.

FIG. 1 illustrates a system 100 configured for synchronizing identity information across identity domains in an identity infrastructure, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a first identity data identifying module 108, a second identity data identifying module 110, request receiving module 112, identity data update module 114, synchronization module 116, request module 118, suitability module 120, identity data denying module 122, identity data changing module 124, and/or other instruction modules.

In some implementations, server(s) 102, client computing platform(s) 104, and/or external resources 126 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

First identity data identifying module 108 may be configured to identify at least one of first identity data and first identity metadata in a first identity domain. In some embodiments, one or more first credentials, first attributes, and/or first policy rules may be associated with the first identity domain. Additionally, or alternatively, the one or more first credentials, first attributes, and/or first policy rules may be associated with one or more of the first identity data and/or first identity metadata.

Second identity data identifying module 110 may be configured to identify at least one of second identity data and second identity metadata in a second identity domain. By way of non-limiting example, one or more second credentials, second attributes, and second policy rules may be associated with the second identity domain. It should be noted that, while system 100 depicts two identity data identifying modules, different numbers (e.g., 1, 3, 4, 10, etc.) of identity data identifying modules may be contemplated in other embodiments.

Request receiving module 112 may be configured to receive a request to change the at least one of the first identity data and the first identity metadata for at least one user.

Identity data update module 114 may be configured to update the at least one of second identity data and second identity metadata for the at least one user. The updating may be based at least in part on the request to change the at least one of the first identity data and the first identity metadata.

Synchronization module 116 may be configured to process one or more identity infrastructure events, where processing the one or more identity infrastructure events may include evaluating the one or more events with respect to a synchronization between the first identity domain and at least one other identity domain, such as the second identity domain. In some cases, the synchronization module 116 may also be referred to as a synchronizing agent (e.g., shown as synchronizing agent 628 in FIG. 6A). By way of non-limiting example, receiving a request to change the at least one of the first identity data and first identity metadata may further include using the synchronizing module 116 to intercept the request to change the at least one of the first identity data and first identity metadata, process the at least one of first identity data and first identity metadata, identify one or more modifications in the at least one of first identity data and first identity metadata, and evaluate a compatibility of the at least one of first identity data and first identity metadata modifications with respect to the second identity domain.

Request module 118 may be configured to transmit a request to the first identity domain to reverse the changes to the at least one of the first identity data and the first identity metadata. The request to reverse the changes may be based at least in part on the compatibility evaluation performed by the synchronization module 116. In some circumstances, different identity domains may have different requirements, for instance, with regards to their mandatory user attributes, format and/or syntax of those attributes, etc. For example, the second identity domain may have different requirements for the information needed to create a valid user record (or user profile) as compared to the first identity domain. For instance, the first and second identity domains may be different with regards to their mandatory user attributes (e.g., first identity domain requires a secondary email address, while the second identity domain requires a secondary phone number), format and/or syntax of those attributes (e.g., first identity domain only accepts phone numbers in (123)456-789 format, and the second identity domain only accepts phone numbers in 123456789 format), and how a user is activated (e.g., via email, push notification on a registered device, such as a smartphone, voice call, text or SMS, etc.), to name a few non-limiting examples. In some cases, the system 100 may ingest, interpret, and resolve any inconsistencies or discrepancies between the different requirements for the two identity domains prior to migrating the user, applying changes to the first identity data and/or first identity metadata in the first identity domain, updating the second identity data and/or second identity metadata in the second identity domain, etc. For example, a migrating agent (e.g., shown as migrating agent 578 in FIG. 5) or another module may specify one or more requirements for defining and storing user data in the second identity domain before creating a user profile for a user in the second identity domain, wherein the user data comprises one or more of a user identifier, user credentials information, and any other applicable identity data.

Suitability module 120 may be configured to ensure suitability of the requested changes to the at least one of the first identity data and first identity metadata in the second identity domain by confirming the requested changes meet the one or more second, credentials requirements, attributes requirements, and policy rules requirements.

Identity data denying module 122 may be configured to deny application of the request to change the at least one of first identity data and first identity metadata for the at least one user based in part on the compatibility evaluation by the synchronization module 116 (also referred to as the synchronizing agent).

Identity data changing module 124 may be configured to change the at least one of first identity data and first identity metadata for at least one user from one or more first identity domain first values to one or more first identity domain second values. Some non-limiting examples of identity domain values include user attributes (as described above, including at least first identity data and first identity metadata for at least one user and/or identity metadata (e.g., for defining one or more requirements that must be met in order to create a user within an identity domain). Other types of identity domain values known in the art are contemplated in different embodiments. Additionally, or alternatively, identify data changing module 124 may be configured to update the at least one of second identity data and second identity metadata, wherein the updating includes changing the at least one of second identity data and second identity metadata from one or more second identity domain first values to one or more second identity domain second values. The second identity domain second values may be equivalent to the one or more first identity domain second values. In this way, the at least one of second identity data and second identity metadata may be synchronized with the one or more first identity domain second values. In some examples, the one or more first identity domain first values and one or more first identity domain second values may be in a first identity domain format. Further, the one or more second identity domain first values and one or more second identity domain second values may be in a second identity domain format. Although not necessary, the first and second identity domain formats may be different. In some cases, synchronizing the at least one of second identity data and second identity metadata to the one or more first identity domain second values may include one or more of synchronizing live first identity domain credentials and synchronizing non-live first identity domain credentials.

By way of non-limiting example, one or more first credentials, first attributes, and first policy rules may be associated with the at least one of first identity data and first identity metadata. Using the synchronizing agent (e.g., synchronization module 116) to evaluate a compatibility of the at least one of first identity data and first identity metadata modifications with respect to the second identity domain may include comparing the requested changes to the at least one of the first identity data and first identity metadata with respect to the one or more second credentials requirements. Using the synchronizing agent or module 116 to evaluate a compatibility of the at least one of first identity data and first identity metadata modifications with respect to the second identity domain may include comparing the requested changes to the at least one of the first identity data and first identity metadata with respect to the one or more second attributes requirements. In some embodiments, one or more of the first credentials and the second credentials may include a respective password. Furthermore, credential requirements (e.g., second credentials requirements) may include at least one or a credential length and a credential character set. In some cases, attributes requirements (e.g., second attributes requirements) may include an alphanumeric string (e.g., a government-issued alphanumeric string, such as a Social Security Number (SSN)) associated with the user) and/or an existence of at least one identified user group for the at least one user. In some cases, using the synchronizing agent or module 116 to evaluate a compatibility of the at least one of first identity data and first identity metadata modifications with respect to the second identity domain may include comparing the requested changes to the at least one of the first identity data and first identity metadata with respect to the one or more second policy rules requirements. In some examples, policy rules (e.g., first policy rules, second policy rules) may include a time-based rule. Further, policy rules requirements may include policy rules based on, for example, OKTA identity domain requirements. Other types of policy rules requirements based on other identity domains are contemplated in different embodiments. In some implementations, the one or more second credentials may include one or more second credentials requirements. In some implementations, the one or more second attributes may include one or more second attributes requirements. In some implementations, the one or more second policy rules may include one or more second policy rules requirements. In some implementations, the second identity domain format may be different than the first identity domain format.

By way of non-limiting example, ensuring suitability of the requested changes to the at least one of the first identity data and the first identity metadata with respect to the second identity domain may be based at least in part on confirming the requested changes meet the one or more second credentials requirements, second attributes requirements, and/or second policy rules requirements. Receiving the request to change the at least one of the first identity data and the first identity metadata for the at least one user may include identifying one or more identity infrastructure events that may prevent synchronization or cause un-synchronization of identity domains. For example, in some circumstances, user attributes may need to be updated and/or synchronized to different identity domains in a specific order, and failure to do so might prevent synchronization or cause un-synchronization of the different identity domains. In another example, synchronization of identity data and/or identity metadata between a first and a second identity domain may require an additional synchronization between the second and a third identity domain. In some examples, receiving the request to change the at least one of first identity data and first identity metadata for at least one user may further include processing the one or more identity infrastructure events. In some embodiments, receiving the request to change the at least one of first identity data and first identity metadata for at least one user may include providing an alert relating to the synchronization between the at least one of first identity data and first identity metadata and the at least one of second identity data and second identity metadata.

Some non-limiting examples of identity infrastructure events are further described below. In some examples, the one or more infrastructure events may include an action that alters the at least one of second identity data and second identity metadata. In some examples, the one or more infrastructure events may further include adding second identity domain users (e.g., adding one or more user profiles or records in the second identity domain). In some other cases, the one or more infrastructure events may include deleting second identity domain users (e.g., deleting one or more user profiles or records associated with the second identity domain). Additionally, or alternatively, the one or more infrastructure events may include altering one or more user attributes in the second identity domain. In some cases, the one or more infrastructure events may also include altering one or more user credentials associated with the second identity domain.

In some embodiments, the one or more infrastructure events may include altering second identity domain access policy rules. In some cases, updating the at least one of second identity data and second identity metadata for the at least one user may include requesting to update the at least one of second identity data and second identity metadata for the at least one user, and determining at least a portion of the second identity data and/or second identity metadata is not updating for the at least one user in the non-syncing domain (e.g., the second identity domain). For instance, in some cases, at least one of the second identity data or the second identity metadata may not update due to a protocol associated with the second identity domain. In such cases, the second identity domain may be referred to as the non-syncing (or non-synchronizing) domain. In some implementations, by way of non-limiting example, the protocol may include at least one of Security Assertion Markup Language (SAML), OAuth, OpenID Connect, and System for Cross-domain Identity Management (SCIM). In some cases, SAML may be used to refer to an open standard for exchanging authentication and authorization data between parties, such as an identity provider and a service provider. SAML is an XML-based markup language for security assertions. In some cases, OAuth may refer to an open standard for access delegation, which may be utilized to grant websites or applications access to a user's information on other websites, without the user giving the websites or applications their password. OpenID Connect may refer to an identity layer on top of another protocol, such as an OAuth protocol. Further, OpenID Connect may allow clients to verify the identity of an end-user based on authentication performed by an authorization server, as well as obtain basic profile information about the end-user in an interoperable and representational state (REST)-like manner. Lastly, SCIM may refer to a standard for automating the exchange of user identity information between different identity domains, or Information Technology (IT) systems.

In some embodiments, the one or more infrastructure events may include proxying and/or intercepting the request to change the at least one of first identity data and first identity metadata for at least one user. Additionally, or alternatively, the one or more infrastructure events may include proxying and/or intercepting the request to update the at least one of second identity data and second identity metadata for at least one user in the first identity domain prior to updating the at least one of second identity data and second identity metadata for the at least one user in the second identity domain. In some embodiments, the synchronizing agent or another module of the system 100 may proxy and/or intercept such requests. In some implementations, live credentials may include readable credentials. In some implementations, by way of non-limiting example, non-live credentials may include encrypted, hashed, and non-reversible credentials. In some implementations, at least one of the plurality of second identity domains may include a non-syncing domain.

Server(s) 102 may include electronic storage 128, one or more processors 130, and/or other components. Server(s) 102 may include communication lines, or ports to enable the exchange of information with a network 150 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute modules 108, 110, 112, 114, 116, 118, 120, 122, and/or 124, and/or other modules. Processor(s) 130 may be configured to execute modules 108, 110, 112, 114, 116, 118, 120, 122, and/or 124, and/or other modules by software; hardware; firmware; some combination of software, hardware, and/or firmware; and/or other mechanisms for configuring processing capabilities on processor(s) 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, and/or 124 are illustrated in FIG. 1 as being implemented within a single processing unit, in implementations in which processor(s) 130 includes multiple processing units, one or more of modules 108, 110, 112, 114, 116, 118, 120, 122, and/or 124 may be implemented remotely from the other modules. The description of the functionality provided by the different modules 108, 110, 112, 114, 116, 118, 120, 122, and/or 124 described below is for illustrative purposes, and is not intended to be limiting, as any of modules 108, 110, 112, 114, 116, 118, 120, 122, and/or 124 may provide more or less functionality than is described. For example, one or more of modules 108, 110, 112, 114, 116, 118, 120, 122, and/or 124 may be eliminated, and some or all of its functionality may be provided by other ones of modules 108, 110, 112, 114, 116, 118, 120, 122, and/or 124. As another example, processor(s) 130 may be configured to execute one or more additional modules that may perform some or all of the functionality attributed below to one of modules 108, 110, 112, 114, 116, 118, 120, 122, and/or 124.

Figure 2:
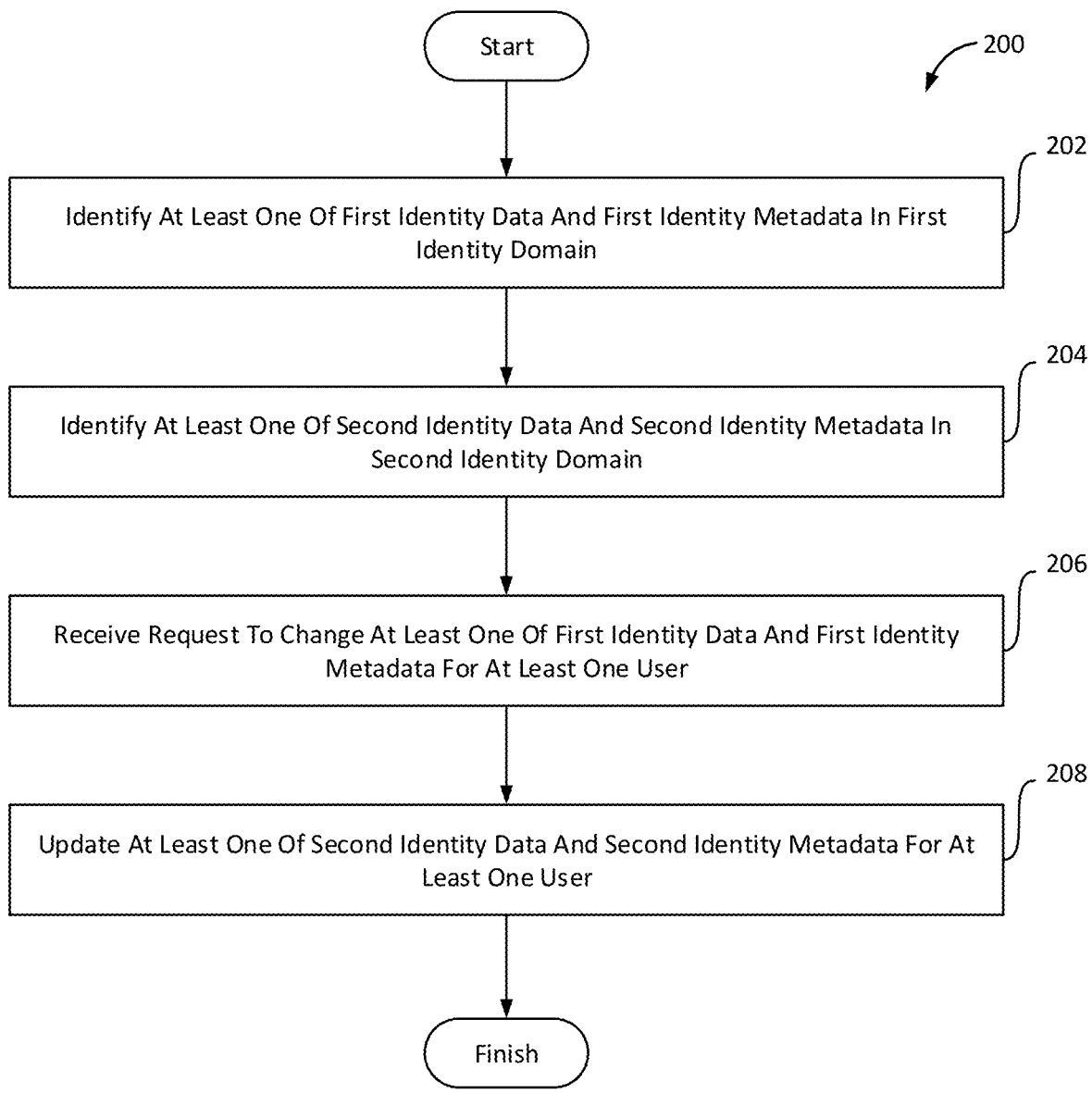
FIG. 2 illustrates a method for synchronizing identity information across identity domains in an identity infrastructure, in accordance with one or more implementations.

FIG. 2 illustrates a method 200 for synchronizing identity information across identity domains in an identity infrastructure, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

A first operation 202 may include identifying at least one of first identity data and first identity metadata in a first identity domain. First operation 202 may be performed by one or more hardware processors configured by machine-readable instructions including a module that is the same as or similar to first identity data identifying module 108, in accordance with one or more implementations.

A second operation 204 may include identifying at least one of second identity data and second identity metadata in a second identity domain. Second operation 204 may be performed by one or more hardware processors configured by machine-readable instructions including a module that is the same as or similar to second identity data identifying module 110, in accordance with one or more implementations. In some cases, first and second identity data identifying modules may be similar or substantially similar.

A third operation 206 may include receiving a request to change the at least one of first identity data and first identity metadata for at least one user. Third operation 206 may be performed by one or more hardware processors configured by machine-readable instructions including a module that is the same as or similar to request receiving module 112, in accordance with one or more implementations.

A fourth operation 208 may include updating the at least one of second identity data and second identity metadata for the at least one user. The updating may be based at least in part on the request to change the at least one of the first identity data and the first identity metadata for the at least one user. Fourth operation 208 may be performed by one or more hardware processors configured by machine-readable instructions including a module that is the same as or similar to identity data update module 114, in accordance with one or more implementations.

FIG. 3A illustrates identity infrastructure 301-*a* within a distributed identity management environment, according to an embodiment of the disclosure. In some cases, the identity infrastructure 301-*a* may comprise one or more identity infrastructure elements 316 and may be associated with one or more identity domains or identity management systems. For example, each of the one or more identity infrastructure elements 316 may be associated with one identity domain of the one or more identity domains. Alternatively, multiple identity infrastructure elements 316 may be associated with a single identity domain. In some examples, the identity infrastructure 301-*a* may be deployed by a single client organization or enterprise. In some cases, at least a portion of the identity infrastructure elements 316 may be associated with one or more cloud computing platforms. For instance, the client organization may utilize the cloud computing platforms for running applications ("apps") used by the client organization's workforce (e.g., a CRM app, such as SALESFORCE provided by Salesforce.com, Inc., of San Francisco, CA, an accounting app, project management app, an app or software used by their HR department, to name a few non-limiting examples) and/or the client organization's customers (e.g., a customer self-service portal used by customers of a wireless provider or internet-cable company). The identity infrastructure 301-*a* may include one or more identity domains and one or more identity infrastructure elements (e.g., shown as identity infrastructure elements 316 in FIG. 3A). The one or more identity domains may further comprise one or more identity domain elements. The one or more identity domain elements may comprise hardware (e.g., servers, computing devices or platforms, etc.), software (e.g., a cloud service), or a combination thereof. It is contemplated that the identity infrastructure may comprise more than one identity domain. However, it is further contemplated that an identity domain may not be subordinate to an identity infrastructure. Each identity domain may comprise domain elements which include the components that make up the identity domain. The components of the identity domain may include the identity data or metadata that may be discovered.

In some cases, the distributed identity management environment may comprise a system 300-*a* for migrating and/or synchronizing identity information across identity domains in the identity infrastructure 301-*a*. System 300-*a* may be similar or substantially similar to the system 100 described in relation to FIG. 1. In some embodiments, the system 300-*a* may comprise a centralized server. The system 300-*a* may be implemented using a server (e.g., the system 300-*a* may be hosted on a server), where the server may be utilized for migrating and/or synchronizing identity information or data in the identity infrastructure. In some other cases, the server or system 300-*a* may manage multiple distributed identity management environments, each distributed identity management environment associated with at least one enterprise or organization and comprising one or more identity infrastructure elements. For instance, the server (or system 300-*a*) may be located in the cloud (i.e., not exclusive to a single client) and may simultaneously discover, assess, and manage identity infrastructure elements across multiple distributed identity management environments via the cloud. Alternatively, the identity infrastructure and/or disparate identity domains (e.g., cloud-based, on-premises, etc.) for each client organization or enterprise may be assessed via an existing identity infrastructure element (e.g., identity infrastructure element 316-*a*, which may be an example of an on-premises Apache or Nginx server).

In some embodiments, protected resources (e.g., applications or apps) may be distributed across multiple on premises and/or cloud platforms. For instance, a company or organization may comprise first apps 325-*a* deployed on a first on-premises platform (e.g., identity system 316-*a*), second apps 325-*b* deployed on a first cloud platform (e.g., identity system 316-*b*), third apps 325-*c* deployed on a second cloud platform (e.g., identity system 316-*c*), fourth apps 325-*d* deployed on a third cloud platform (e.g., identity system 316-*d*), fifth apps 325-*e* deployed on a fourth cloud platform (e.g., identity system 316-*e*), and sixth apps 325-*f* deployed on a fifth cloud platform (e.g., identity system 316-*f*). In some cases, each platform (e.g., on-premises, cloud platform) may be associated with a unique identity infrastructure system and management system (e.g., unique identity domain). For instance, each platform may be associated with a unique set of identity infrastructure elements 316. In some circumstances, each of the one or more identity infrastructure elements 316 may comprise varying configurations and/or behaviors. Some non-limiting examples of identity infrastructure elements 316 installed in the identity infrastructure include servers, routers, identity stores, policy enforcement points, authentication points, proxies or proxy devices, policy decision points, etc., further described in relation to the figures below. In some examples, the identity policies comprise at least one of authorization rules and mechanisms and authentication rules and mechanisms. Further, the identity data may be utilized to access and control the one or more protected resources.

In some cases, assessment of identity resources or identity infrastructure elements in an identity infrastructure may begin by the introduction of workers and/or proxies into the identity infrastructure. These workers and/or proxies may comprise discovery agents to assist in the detection and assessment of the identity information, such as identity data and identity metadata, stored within the identity infrastructure elements. In some cases, one or more discovery agents 305 may be installed within the identity infrastructure 301-*a*. In some examples, the discovery agents 305 may report information about the identity infrastructure to another agent or module, for instance, the first identity data identifying module 108 or the second identity data identifying module 110 previously described in relation to FIG. 1. Such information may comprise a list of identity infrastructure elements which includes network location (e.g., IP address), configuration information for the various identity infrastructure elements 316, information pertaining to how the infrastructure elements communicate with each other and/or other devices in the architecture, information pertaining to the types of authentication and authorization mechanisms supported (or required) by the infrastructure elements 316, and/or what metadata the infrastructure elements 316 use, such as authentication or authorization policies, password policies, etc.

A discovery agent may refer to an entity (e.g., autonomous or semi-autonomous software entity) that is capable of assessing identity information within an identity infrastructure. Non-limiting examples of this information include identity data, identity metadata, contents of identity sessions, protected resources (e.g., applications or apps), and the configuration and deployment of software and hardware entities (e.g., identity domain elements) that make up an identity domain. For the purposes of this disclosure, a protected resource comprises an element or application of the identity infrastructure to which access and control is allowed or restricted based at least in part on identity data and/or metadata. An autonomous or semi-autonomous discovery agent may refer to the different actions the discovery agent undertakes, depending on the component within the identity domain the discovery agent is interacting with. For example, a discovery agent interacting with a web server may need to undertake different actions to understand the identity data associated with the web server as compared to the actions undertaken by a discovery agent deployed to interact with an identity data store, also referred to herein as a data store or simply a "store". Understanding the collection of unique identity data or metadata utilized by each of these autonomously operating components (web server, data store) may be required to build a complete picture of the distributed components and data of an identity domain and the identity infrastructure. At least one discovery agent is deployed at the beginning of a discovery process, which may be a precursor to the migration process. In such a scenario, the discovery agent may be installed on a server adjacent to the identity domain elements (e.g., discovery agent 305-*a* installed on or adjacent to identity infrastructure element 316-*a* in FIG. 3A). As different elements of the identity domain are discovered, additional discovery agents may be installed on different servers adjacent to the different elements. For example, and as described herein, discovery agents may collect identity data and metadata from the elements in an identity infrastructure. Such identity data and metadata includes identity system configuration data and user identity attributes (both of which may be located in some predefined store), generated data such as log files (which is created as activity happens in the identity system), and real-time data such as a user making a request through his/her browser to an application (this real-time data travels over the network, changes frequently, and may be stored in ephemeral, in-memory data storage). In some examples, the discovery agents may access this ephemeral, in-memory data storage.

As shown, a first discovery agent element 305-*a* may be installed on or near an identity infrastructure element 316-*a* (e.g., an Apache or NGINX server). In some examples, the system 300-*a* may comprise at least one module 328, which may be an example of a migrating agent (also shown as migrating agent 578 in FIG. 5), a synchronizing agent (also shown as synchronization module 116 in FIG. 1, synchronizing agent 628 in FIG. 6A), a request receiving module (e.g., request receiving module 112 in FIG. 1), an identity data update module (e.g., identity data update module 114 in FIG. 1), a suitability module (e.g., suitability module 120 in FIG. 1), or any other module described herein. The system 300-*a* and the at least one module 328 may manage at least a portion of the one or more identity domains, synchronize identity information across disparate identity domains, migrate identity information across identity domains, replicate user profiles and/or identity information and create user profiles in different identity domains based on the replicating, manage a plurality of identity session formats and identity data, process identity sessions and/or identity data, and provide access to protected resources based at least in part on the processing, to name a few non-limiting examples. Additionally, or alternatively, the system 300-*a* and the at least one module 328 may assess the identity infrastructure 301-*a* by the at least one discovery agent element 305-*a*. In some cases, additional discovery agent elements 305 (e.g., discovery agent element 305-*b*, 305-*c*, etc.) may be spawned. It should be noted that the dash-dot lines for the discovery agent elements 305-*b*, 305-*c*, 305-*d*, 305-*e*, and 305-*f* indicate that they are optional. The number of additional discovery agent elements that are spawned may be based on one or more factors. Some non-limiting examples of such factors include, policy and configuration related information read from an identity infrastructure element 316 that indicates information pertaining to other identity infrastructure elements deployed; discovery of one or more identity infrastructure elements in a different part of the network (e.g., in a different network segment); and analyzing the flow of traffic over the network, to name a few non-limiting examples. As noted above, some non-limiting examples of identity infrastructure elements include proxies, web servers and web server agents, identity stores, and software development kits (SDKs). In some cases, additional discovery agents may be spawned based on discovering that one or more identity infrastructure elements are deployed in a different network segment. These additional discovery agents may help create a more detailed picture of the identity infrastructure elements in that network segment. In another example, one or more additional discovery agents may be installed based on analyzing the flow of traffic (i.e., dataflows) in the identity infrastructure. In such cases, the additional discovery agents may serve to provide additional insight on where and how user access takes place in the identity infrastructure.

In some cases, assessing the identity infrastructure 301-*a* may comprise one or more of identifying the one or more infrastructure elements 316 within the identity infrastructure, intercepting network traffic in the identity infrastructure, assessing a status and structure of the identity infrastructure, detecting and assessing one or more configurations of the one or more infrastructure elements installed in the identity infrastructure, and/or detecting and assessing protected resources, such as apps 325, within the identity infrastructure. For example, after collecting data from the one or more discovery agents and evaluating certain policies in conjunction with authentication by an identity domain, the module 328 may determine which types of access is granted on resources in the identity infrastructure 301-*a* and for which users. This evaluation may represent the "status" of the identity infrastructure.

In some cases, the system 300-*a* may comprise a configuration detection module (e.g., shown as configuration detection module 372 in FIG. 3B), where the configuration detection module may detect and assess one or more configurations of one or more infrastructure elements installed in the identity infrastructure 301-*a*, seen in FIG. 3A, based at least in part on the identifying the one or more infrastructure elements. By way of non-limiting example, the one or more configurations may include at least one of the identity data and metadata that may be stored within the identity infrastructure elements, information related to a flow of data associated with the one or more infrastructure elements, and behavior of the one or more identity infrastructure elements. As an example, if a user is attempting to access a protected resource, a request may be sent to a corresponding identity infrastructure element. If the request arrives without an identity session, the user may be redirected to a login page for a corresponding identity domain, where the user is prompted for login credentials (e.g., a user identity, a user credential, a user attribute, etc.). The login credentials may be received as a dataflow 315, where the dataflow 315 may be linked to an identity session. After the identity session is established (i.e., after receiving the login credentials from the user and the system 301-*b* accepting the login credentials), the user may be redirected to the protected resource.

In some cases, establishing the identity session may comprise accepting the identity session by the protected resource, where the accepting comprises evaluating the identity session and/or identity data (e.g., login credentials). In this example, the discovery agent element 305-*a* seen in FIG. 3A may detect and assess the network and/or identity traffic as it is routed to the protected resource (e.g., resource or app 325-*a*), for instance, to identify the type of information a successful request contains, to identify how and where unsuccessful requests are routed, etc. A successful request may refer to a request where a user gains access to the protected resource. Contrastingly, an unsuccessful request may refer to a request where the user is denied access to the protected resource. In some circumstances, a request may be unsuccessful, for instance, when a user is unable to authenticate (e.g., incorrect password) and is redirected to a page that indicates the account has been locked or the password needs to be reset. In some other cases, a request may be unsuccessful as the result of a user making a request for accessing a resource that they are not authorized to access. The user may or may not be authenticated for the identity domain associated with said resource. In some cases, the user may be redirected to a page where they can submit a self-service request to access the unauthorized resource, for instance.

As noted above, the one or more infrastructure elements 316 installed in the identity infrastructure may include one or more of servers, routers, identity stores comprising one or more databases of authentication information, policy enforcement points for enforcing authorization rules, authentication points for determining user identity, proxy devices or proxies, policy decision points for evaluating authorization rules, and/or protected resources, to name a few non-limiting examples. In some cases, the discovery agent element 305-a may identify at least a portion of these identity infrastructure elements. For instance, in one non-limiting example, the discovery agent may identify that infrastructure element 316-a comprises a server and an identity store, infrastructure element 316-b comprises a policy enforcement point and a policy decision point, and infrastructure element 316-c comprises an authentication point. In another example, the discovery agent may identify that infrastructure element 316-a is associated with an on-premises identity domain, such as Symantec SiteMinder provided by Broadcom, Inc., of San Jose, CA, and may comprise one or more of Lightweight Directory Access Protocol (LDAP), Active Directory, SQL databases, APIs, and apps-based data. Further, the discovery agent may identify infrastructure element 316-b as associated with a cloud-based identity system, such as Azure AD provided by Microsoft Corporation of Redmond, WA, Okta provided by Okta, Inc., of San Francisco, CA, etc. In some embodiments, the discovery agent element 305 may report this information to the system 300-a or any of the other modules described in relation to FIG. 1 or any other figure as described herein.

In some cases, each of the dashed lines seen in FIGS. 3A and/or B represents a dataflow 315 (e.g., flow of network traffic). As used herein, the terms "dataflow" or "data flow" may refer to a path for data to move from different parts of the distributed identity management environment comprising the identity infrastructure 301-a seen in FIG. 3A. For instance, dataflow may refer to a path for data to move between different identity infrastructure elements 316, between different discovery agent elements 305, and/or between a discovery agent element 305 and the system 300-a, to name a few non-limiting examples. In some examples, a dataflow may represent a single data element (e.g., username, password, date of birth, Social Security Number (SSN), etc.). Alternatively, a dataflow may represent a set of data elements (e.g., a data structure comprising a username and password, where the password may or may not be hashed). In some other cases, a dataflow may be used to organize data (i.e., data may be transformed as part of the dataflow). In some aspects, dataflows may help reusability of the underlying data elements, for instance, during migration or synchronization between different identity infrastructure elements within the identity infrastructure.

In some cases, the one or more dataflows 315 may pertain to identity data or identity metadata requests from the one or more infrastructure elements 316 and/or the system 300-a within the identity infrastructure 301-a. In some cases, the at least one discovery agent element 305 (e.g., discovery agent element 305-a) or another module (e.g., module 328) may intercept first network traffic (e.g., a dataflow 315) in the identity infrastructure, where the first network traffic may include one or more of requests for identity data and identity metadata from the one or more infrastructure elements 316. In some cases, the identity data and/or identity metadata may be stored within the one or more identity infrastructure elements. In intercepting network traffic, such as a request for identity data or identity metadata, between the infrastructure element 316-c (i.e., comprising an authentication point) and the infrastructure element 316-a (i.e., comprising a server and an identity store), the discovery agent element 305 may obtain information for determining user identity. In some other cases, the one or more dataflows 315 may pertain to user credentials information (e.g., a password within a login request), verification information (e.g., for user credentials, user identifier, etc.), user profile data for one or more users, modified user data (e.g., if user data is compromised), etc.

Figure 3B:
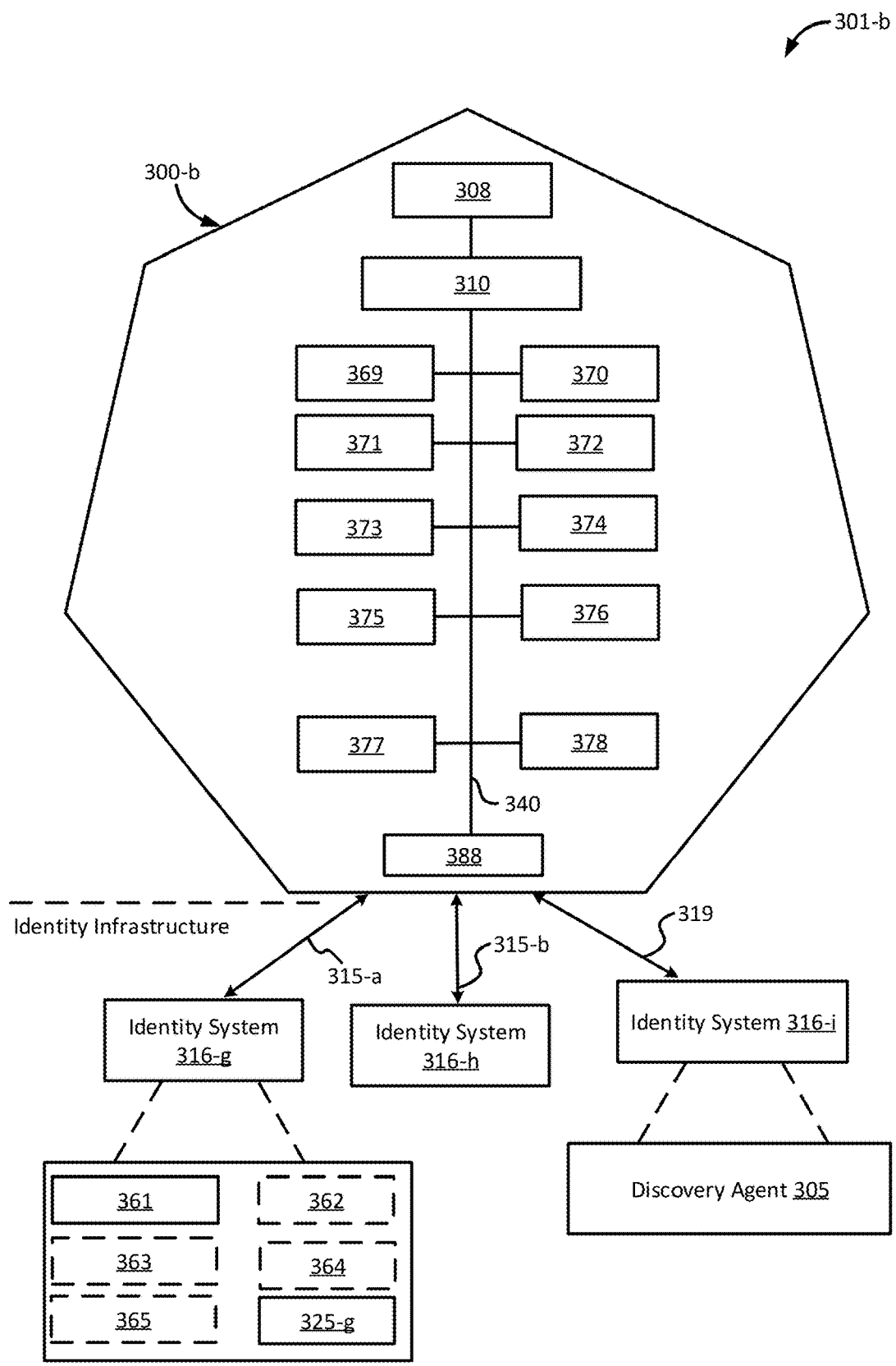
FIG. 3B illustrates a detailed view of the system in FIG. 3A, according to an embodiment of the disclosure.

FIG. 3B illustrates a detailed view of a system 300-b for migrating and/or synchronizing identity information in identity infrastructure 301-b, according to an embodiment of the disclosure. In some cases, the system 300-b may be similar or substantially similar to the system 100 and/or 300-a in FIGS. 1 and/or 3A, respectively. Furthermore, the identity infrastructure 301-b may be similar or substantially similar to the identity infrastructure 301-a described in relation to FIG. 3A. In some cases, system 300-b may comprise one or more of: a first identity data identifying module 308, a second identity data identifying module 310, a request receiving module 369, an identity data update module 370, a synchronization module 371, a configuration detection module 372, a suitability module 373, an identity data denying module 374, an identity data changing module 375, and a request module 376 which may be similar or substantially similar to the respective modules previously described in relation to FIG. 1 and elsewhere herein. The system 300-b may also comprise a synchronizing agent 377, a migrating agent 378, and a connecting agent 388. In some cases, the various elements, agents, and/or modules of the system 300-b may be embodied in hardware, software, or a combination thereof. Further, the one or more modules (also referred to as agents or elements) may be in communication via a bus 340. One or more of the modules in system 300-b may be optional. Alternatively, the system 300-b may comprise one or more additional modules not shown herein.

In some cases, detection and assessment of identity infrastructure elements (e.g., identity infrastructure elements 316-g, 316-h, etc.) may begin by the introduction of workers and/or proxies into the identity infrastructure. It should be noted that the identity infrastructure elements 316 may also be referred to as identity systems 316, and the two terms may be used interchangeably. In some cases, each of the one or more identity infrastructure elements 316 in FIG. 3B may be associated with a unique identity domain of one or more identity domains. In some examples, at least one of the identity domains may be a cloud-based identity domain (e.g., Azure AD provided by Microsoft, Corp., of Redmond, WA). In some cases, one or more discovery agents 305 may be installed within the identity infrastructure. For instance, the system 300-b may disperse one or more discovery agents 305 for installing in the identity infrastructure. The discovery agents may gather information about the architecture of the identity infrastructure and communications (e.g., dataflows 315) between various users of the identity infrastructure and different apps or subsystems being accessed by said users, to name a few non-limiting examples. The discovery agent 305 may report information about the identity infrastructure to any of the modules of the system 300-*b*, for instance, the first or second identity data identifying modules 308 or 310, respectively. Such information may comprise where the various identity infrastructure elements 316 are located in the network (e.g., network information such as, but not limited to, IP addresses), how the identity infrastructure elements 316 communicate with each other and/or other devices in the architecture (e.g., where data is stored, how authentication occurs, etc.), what types of authentication and authorization the identity infrastructure elements 316 require, and what metadata the systems use, such as authentication or authorization policies, password policy, etc.

In some examples, each identity infrastructure element may be associated with or store information pertaining to one or more configurations 361. Optionally (shown by the dashed lines), at least a portion of the identity infrastructure elements 316 may store information pertaining to one or more groups 362, roles 363, features 364, and/or identities 365 related to the policies of the corresponding identity infrastructure element. Further, the one or more identity infrastructure elements (or alternatively, the connecting agent 388) may enforce one or more policies before users are allowed to gain access to applications (e.g., protected resources 325-*g*) through the corresponding identity domain, or alternatively, another identity domain. In some aspects, the identity infrastructure element or the connecting agent 388 may also serve as a gateway to the applications or protected resources.

In some cases, the system 300-*b* may install 319 at least one discovery agent element (e.g., discovery agent 305) in the identity infrastructure. The identity infrastructure may include the one or more identity domains and identity infrastructure elements, and the at least one discovery agent 305 may be installed on or adjacent to an identity infrastructure element 316-*i* in the identity infrastructure. In some examples, the identity infrastructure element 316-*i* may be an Apache Server, an IIS Server, or any other piece of identity infrastructure e.g., on an Apache or Nginx server, or on the control elements of an established identity domain, such as an Oracle Access Manager (OAM) Server. Alternatively, the identity infrastructure element 316-*i* may be located in the cloud and adapted to communicate and otherwise exchange data with other devices in the identity infrastructure 301-*b* via any identity protocol, for example OpenID Connect (OIDC), Security Assertion Markup Language (SAML), New Technology LAN Manager (NTLM); or via any other software communication protocol such as Hypertext Transfer Protocol (HTTP), Transmission Control Protocol (TCP), etc. In some embodiments, the discovery agent 305 and/or a module (e.g., migrating agent 378) of the system 300-*b* may detect and monitor at least one event associated with the one or more dataflows 315. For instance, one such event may comprise a login request or a request to access a protected resource (e.g., protected resource 325-*g*). The event may comprise other operations and features described herein and known in the art. In some cases, the discovery agent may monitor network or identity traffic (e.g., as described above in relation to FIGS. 1 and 3A), identify the information used to establish an identity session (i.e., based on which access to the protected resource is granted), and convey the same to the system 300-*b*.

For example, the system 300-*b* (or one of the modules) may use the at least one discovery agent 305 to assess the identity infrastructure. In some cases, the assessing may comprise identifying one or more identity domains (e.g., identity domain associated with identity infrastructure element 316-*g*) in the identity infrastructure. The assessing may further include one or more of detecting and reporting, to the system 300-*b*, identity data and identity metadata from the identity infrastructure. For instance, the assessing may include detecting and reporting identity data (e.g., identities 365, roles 363, groups 362 related information) and identity metadata (e.g., information pertaining to configurations 361, features 364, policies, such as an authorization policy, network locations, etc.) from identity infrastructure elements 316-*g* and/or 316-*h* in the identity infrastructure. By way of a non-limiting example, the identity data may include one or more of a user identity, a user credential, and a user attribute for one or more individual users of the one or more identity domains. Such attributes may comprise name, address, and group associations. By way of non-limiting example, the identity metadata may include one or more of a password rule, an authorization policy, an authentication policy, a trust policy, and network locations (e.g., HTTP address, URL, FTP address, network address, such as an IP address, a MAC address, to name a few non-limiting examples) for identity domain elements of the one or more identity domains.

In some cases, the system 300-*b* may facilitate unified identity management across multiple identity systems and/or cloud platforms, which may not only allow consistent identities across clouds, but also policies, fundamentals of access control (e.g., how users access protected resources), and/or authentication. For instance, the system 300-*b* may enable an administrator for an organization to create unified policies, as well as consolidate rules (e.g., authentication rules, password rules, etc.), roles, groups, configurations, features, etc., across disparate identity systems. In this way, the system 300-*b* may allow the administrator to manage identities across the different identity systems in a unified manner, which may ease cross-platform compliance, auditing, and/or migration from on-premises systems to the cloud. By way of non-limiting example, managing the one or more dataflows through the identity infrastructure 301-*b* may include managing the one or more dataflows pertaining to identity data, where the identity data includes one or more of an authentication request, an authorization request, and an update of user attributes or credentials. In some cases, the discovery and assessment of the identity infrastructure as described herein, may be a precursor to such unified identity management.

In some cases, the system 300-*b* may identify one or more protected resources, such as protected resource 325-*g*, for one or more identity domains of the identity infrastructure, where each of the one or more protected resource may be at least one of electronically, logistically, and communicatively coupled to one identity domain (e.g., identity domain associated with identity infrastructure element 316-*g*) of the one or more identity domains. In some cases, a dataflow 315-*a* pertaining to first identity data for a first identity domain (e.g., identity infrastructure element 316-*g*) may be received at the identity infrastructure. The dataflow 315-*a* may be associated with a login request from a first user in the first identity domain. For instance, the first identity data may correspond to the first user and may comprise user authentication data (e.g., user identity, user credential, user attribute, etc., for the first user). Further, the dataflow 315-*a* may be linked to a first identity session. In this example, the protected resource 325-*g* may be secured by the identity system 316-*g* (e.g., an on-premises identity system, such as Symantec SiteMinder), and the first user may be attempting to access the protected resource 325-*g*. Although not necessary, in some cases, a request to access the protected resource 325-*g* may be received at the resource or by some other element in the identity infrastructure. The connecting agent 388 may receive, by the protected resource 325-*g* or the identity infrastructure element 316-*g*, a request for session information. In some cases, the connecting agent 388 or another module of the system 300-*b* may process one or more of the information associated with the first identity session and the first identity data and provide access to the protected resource 325-*g* based in part on the processing. In some examples, the first identity session and the first identity data may be associated with the session information, and the first user may be associated with the first identity domain.

In some cases, an enterprise or organization may also wish to secure the protected resource 325-*g* using a cloud-based identity system, such as identity system 316-*h*. For instance, the enterprise or organization may wish to migrate to the cloud-based identity system 316-*h* or extend authentication and/or access control capabilities provided by the identity system 316-*h* to the protected resource 325-*g*, which was originally secured by the identity system 316-*g*. In some cases, after migration, the enterprise or organization may decommission (e.g., take offline) the identity system 316-*g*, while still supporting access to the on-premises protected resource. Alternatively, the enterprise or organization may also migrate the protected resource 325-*g* to the cloud.

The migrating agent 378 and/or any of the other modules of the system 300-*b* may assist in one or more of migrating users and credentials (e.g., identity information associated with the users); synchronizing users, credentials, policies and/or configurations; and abstracting authentication and session management across a plurality of identity domains. In some examples, no or minimal changes may be made to the protected resource 325-*g* (e.g., an app). In this example, after receiving the dataflow 315-*a* associated with the login request, the system 300-*b* may extract from the login request at least one of a user identifier and user credentials information associated with the first user. In some cases, the system 300-*b* may identify one or more credential verification resources associated with or in the first identity domain. The one or more credential verification resources may include password verification endpoints. In some cases, at least one of the user identifier and user credentials information for the first user may be verified, where the verifying may include accessing the one or more credential verification resources. It should be noted that, in this example, the user may be an unmigrated user in the second identity domain (e.g., identity system 316-*h*). An unmigrated user may refer to one who has no entry, such as a relation or presence, in another identity domain. In some cases, migration of the user to the second identity domain may comprise creating a user profile for the user in the second identity domain, where at least a part of the user profile in the second identity domain is associated with one or more of the verified user identifier and/or the verified user credentials information for the first user. Dataflow 315-*b* represents the migration of the user to the second identity domain.

In some embodiments, the migrating agent 378 or another module of the system 300-*b* may also request additional identity data (e.g., additional credentials or identity attributes) for the first user from the first identity domain before creating a user profile for the first user in the second identity domain. In some cases, the additional credentials information may comprise a second factor authentication token, although other types of credential's information may also be requested in different embodiments as described elsewhere in this disclosure. For instance, during live migration, one or more additional credentials may be created for the user. The user may be prompted to provide information pertaining to a token (e.g., from a mobile authenticator app), a USB token (e.g., YubiKey provided by Yubico, Inc., of Palo Alto, CA), or a mobile device that accepts push notifications, to name three non-limiting examples. The user, or alternatively, one of the modules of system 300-*b* may enroll/register the additional credentials information (also referred to as a factor or second-factor) as an additional credential to be used during authentication. In some examples, for instance, during a factor enrollment process, the user may need to prove possession of the token, or acknowledge (e.g., by clicking on) the push notification received on their mobile device. The factor enrollment process may be performed during or before migration to the second identity domain and may be associated with the credential verification. For instance, the user may pass credential verification and factor enrollment if their biometric interaction, such as a fingerprint scan, with the physical token, or a facial recognition interaction with the mobile authenticator app is accepted by the system 300-*b*. In some cases, the additional identity attributes may be received from one or more of a LDAP directory server (e.g., shown as LDAP 433 in FIG. 4), a database, and another identity repository, for example, based on identifying that the additional identity attributes are required or mandatory for creating a user profile in the second identity domain. In some embodiments, the one or more credential verification resources may include password verification endpoints. The password verification endpoints may be associated with or may include one or more of a uniform resource locator (URL) and an application programming interface (API). An authenticate system, such as authenticate system 421 in FIG. 4 and associated with an identity domain, may be one non-limiting example of a credential verification resource. In some cases, the migrating agent or another module may work in conjunction with the compromised accounts database (e.g., shown as compromised accounts database 590 in FIG. 5) to identify the one or more credential verification resources. For example, a credential verification resource may be associated with a third-party service that inspects user credentials to assess whether they have been compromised, for instance, by scanning the dark web for exposed credentials, or monitoring credential breaches, to name two-limiting examples. One non-limiting example of such a third-party service includes the database/API provided by the website, www.haveibeenpwned.com. In some other cases, the credential verification resource may be employed to determine whether a user credential, such as a password, is weak (i.e., easily guessable, and hence more susceptible to compromise).

In some other cases, the system 300-*b* may enable synchronization of identity information between the identity system 316-*g* and identity system 316-*h*, for instance. In some cases, the system 300-*b* may receive a request to change at least one of first identity data and first identity metadata for at least one user, where the first identity data and/or metadata may be associated with a first identity domain (e.g., identity system 316-*g*). The request may be received within dataflow 315-*a*. Although not necessary, the at least one user may have a relation or presence (e.g., user profile) in both the identity systems 316-*g* and 316-*h*. In some examples, the system 300-*b* may identify at least one of second identity data and second identity metadata in the second identity domain (e.g., identity system 316-*h*) and analyze a compatibility of the requested changes to the first identity data and/or first identity metadata with respect to second identity domain requirements (e.g., credentials requirements, attributes requirements, policy requirements, etc., associated with the second identity domain). In some cases, the second identity data and/or second identity metadata may be for the at least one user. After confirming the requested changes match the requirements of the second identity domain, the system 300-*b* may update at least one second identity data and/or second identity metadata for the at least one user in the second identity domain (e.g., shown as dataflow 315-*b*).

Figure 4:
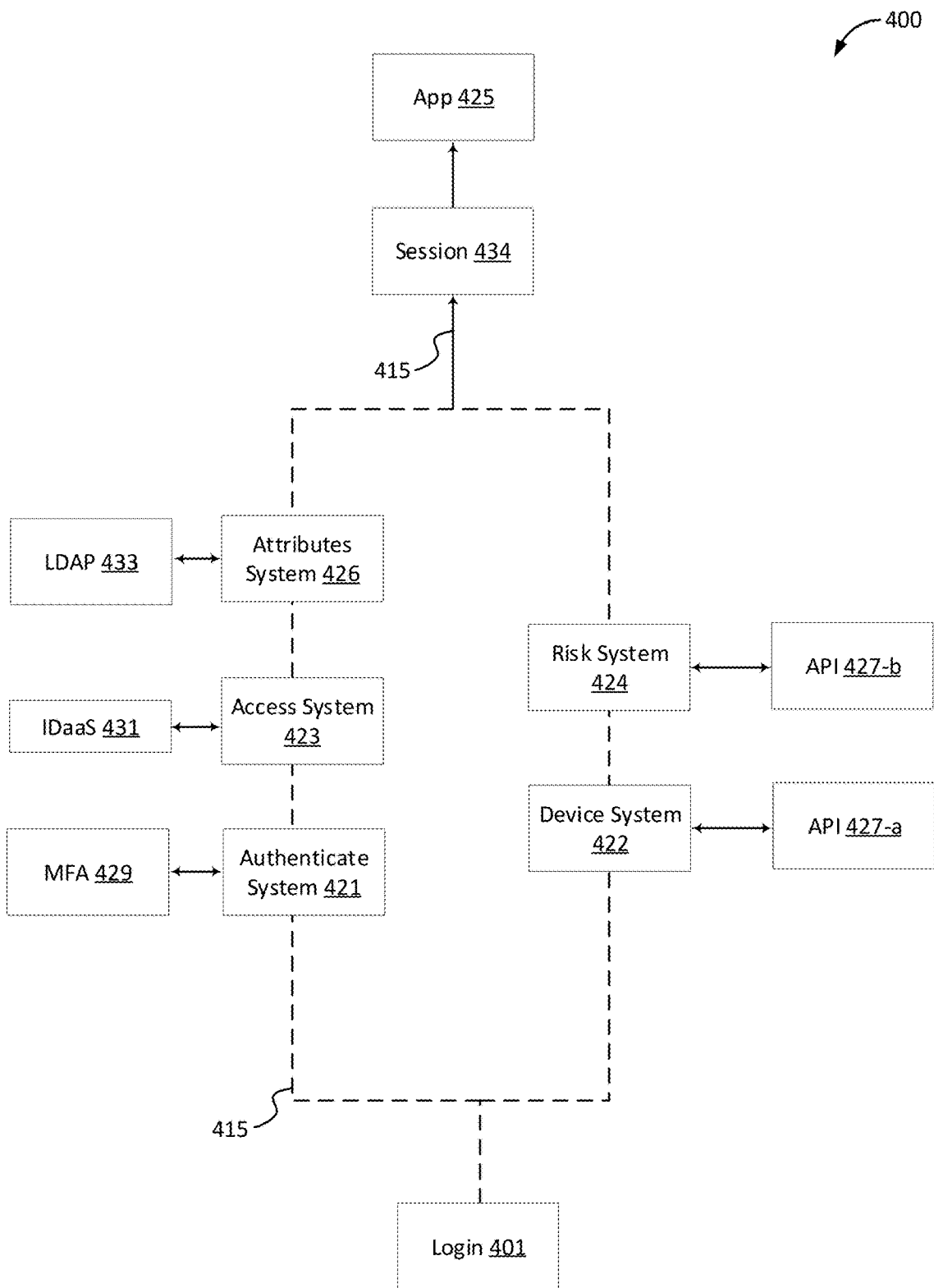
FIG. 4 illustrates a process flow for discovery and assessment of identity infrastructure according to an embodiment of the disclosure.

Turning now to FIG. 4, which illustrates a process flow 400 for discovery and assessment of identity infrastructure according to an embodiment of the disclosure. In some examples, the discovery and assessment may be performed by a discovery agent or any of the other modules described in relation to FIGS. 1 and/or 3B. In some cases, discovery and assessment of identity infrastructure may begin by installing a discovery agent on or near an existing identity infrastructure element, such as an Apache server. As used herein, a discovery agent may refer to an autonomous or semi-autonomous software entity that is configured to assess identity information within an identity infrastructure. Identity information may comprise identity data, identity metadata, structure and/or contents of identity sessions, as well as configuration and deployment information for software and hardware entities of an identity domain. In some cases, the discovery agents may intercept and/or proxy networking traffic (e.g., an identity dataflow 415) as it is relayed to any of the identity infrastructure elements, such as runtime systems (e.g., authenticate system 421, access system 423, attributes system 426, risk system 424, device system 422) for authentication (e.g., multi-factor authentication (MFA)), authorization, gathering identity attributes, etc. MFA refers to a feature where a user may submit multiple factors to be authenticated or gain entry to a network, which may enhance security over single-factor authentication. For instance, a user may be transmitted a 4 or 6 digit code over text, through an app installed on their device, email, voice call, etc. Further, the user may enter the 4 or 6 digit code in addition to their password to get authenticated.

In this example, a user is attempting to access a protected resource, such as an app 425. As shown, the process flow 400 may begin by a login 401 from the user. Login 401 may comprise receiving identity data, including one or more of a username, a password, a fingerprint, iris scan, voice input, unique identifier, unique pin, etc. Following login, the user input may be relayed to any one of the runtime systems as an identity dataflow 415. In some cases, a discovery agent may intercept the networking traffic (i.e., within the identity dataflow 415) and identify the login as identity data.

In this example, the identity dataflow 415 may be sent to one or more identity infrastructure elements, such as an authenticate system 421, an access system 423, an attributes system 426, a device system 422, and/or a risk system 424 associated with an identity domain. In some cases, the identity flow 415 may be sent to other systems not identified herein. In some cases, the authenticate system 421 may support multi-factor authentication 429, the access system 423 may support identity as a service (IDaaS) 431 for authorization, and the attributes system 426 may be linked or associated with a Lightweight Directory Access Protocol (LDAP) 433 for gathering identity attributes. Specifically, access system 423 may enforce decisions about authentication and authorization set by the identity as a service (IDaaS) system 431. IDaaS refers to cloud-based authentication built and operated by a third-party provider, where the third-party provider may ensure that users are who they claim to be, and, if so, grant them access to software applications, files, and/or other resources based on the security permissions assigned to them. IDaaS may be deployed for a multitude of different applications, including, but not limited to, multi-factor authentication (MFA), single sign-on (SSO), and controlling access to restricted data.

In some embodiments, the discovery agent may detect and assess the state and structure of an identity infrastructure by analyzing the network traffic or identity dataflow 415 as it passes en route to the app 425. For instance, the discovery agent may detect the configuration and behavior of the identity infrastructure elements, where the configuration may include identity data and identity metadata stored within the identity infrastructure elements. Behavior may comprise identity operations performed by the elements, examples of which are below. In some cases, assessing the identity infrastructure by the discovery agent may be based at least in part on detecting and assessing one or more identity-centric operations, as described herein with respect to the identity data, metadata, and identity infrastructure elements. In some examples, the one or more identity-centric operations and behavior may comprise at least one of enforcing authentication rules based on an authentication performed by the user (e.g., login 401 and authentication by authenticate system 421), granting or denying access to a protected resource (e.g., based on a request to access app 425), and enforcing authorization rules (e.g., using access system 423). In some examples, the one or more identity-centric operations may also comprise updating user credentials information based on a user modifying their user credentials information, for instance, when the user updates their password. In some cases, modification of user credentials information may be performed via the authenticate system 421 or through a module (e.g., request receiving module 112, identity data update module 114 in FIG. 1) of the system.

In the example shown, the device system 422 may be linked or associated with a first custom API 427-*a*, which may perform device verification, and the risk system 424 may be linked or associated with a second custom API 427-*b*, which may retrieve a threat or risk score. In some embodiments, the APIs 427-*a* and/or 427-*b* may link the device system 422 and/or risk system 424, respectively, to one or more applications (not shown), where the one or more applications may be third-party applications. In some cases, the one or more third party applications may be executed or hosted on another server (not shown). For instance, the device system 422 may interact with a third-party device verification application by making a call (e.g., an API call) using API 427-*a*. The third-party device verification application may then process the information received from the device system 422 (e.g., via the API 427-*a*) and relay a response (e.g., Verified or Not verified, 1 or 0, Yes or No, etc.) to the device system 422, based on which the user device from which the login 401 was received may be verified. In some cases, the device system 422 may receive the response via the API 427-*a*. In some cases, the risk system 424 may also interact with a third-party risk verification application by making an API call using API 427-*b*, where the third-party risk verification application may then relay a response back to the risk system 424 via the API 427-*b*. In some embodiments, the third-party risk and verification applications may be executed or hosted on the same or a different third-party server. In some cases, device verification may serve as an added level of security (i.e., in addition to a username and password, for instance) and may be used to verify that the login 401 is coming from a recognized device (e.g., mobile device, laptop, computer, etc.) associated with an authorized user. In some cases, device verification may comprise transmitting a verification code over text (SMS), a phone call, an app, etc., to a recognized device associated with the user. The device system 422 may verify the device from which the login 401 was received upon the user inputting the same verification code. In some cases, the threat or risk score may be associated with a perceived or estimated threat level (e.g., for a user's identity), and may be based on one or more factors, including, but not limited to, time of day, day of week, geographic data, and/or IP address. For instance, a higher risk score may be assigned when the login 401 is during non-working hours (e.g., 3 AM) as compared to during working hours (e.g., 11 am). In another example, a lower risk score may be assigned when the login 401 is from a known IP address as opposed to an unknown IP address. In yet another example, a higher risk score may be assigned when the login 401 is from a geographic region (e.g., city, state, country, etc.) that the user has never logged in from before.

In some cases, the risk system 424 may authorize or flag the login 401 based in part on comparing the retrieved risk or threat score to a threshold. In one non-limiting example, the login 401 and access to resource (e.g., app 425) may be denied based on the risk score exceeding the threshold (e.g., if it is determined that the user data is compromised based on validating one or more of the user identifier, the user credentials information, and any other identity data for the user). In another example, the user requesting the login 401 may be prompted to change their password (e.g., if the authentication policy states that the password should be updated every 3 months, 6 months, etc.) based on receiving a link or code on a registered device. In this case, the user may need to first click the link or input the code received on their registered device (e.g., a smartphone associated with the user) and then proceed to update their password. The user may then restart the login 401 process via the one or more runtime systems. Alternatively, if the risk or threat score is under a threshold, the login 401 may be successful and a session 434 may be initiated (e.g., the user device may display a Welcome Screen with one or more links to access different apps or resources, including app 425).

The discovery agent element may monitor the identity dataflow as it passes through the various identity infrastructure elements or runtime systems and determine the information used to establish an identity session 434 and gain access to the app 425 (i.e., a successful request). In some cases, the discovery agent element may also identify where unsuccessful requests are routed to (e.g., routed to attributes system 426 so that user password can be updated). In some cases, a session may refer to a temporary and interactive information interchange between two or more communicating devices (e.g., a user device associated with login 401 and a server hosting app 425). Further, an established session may be a prerequisite for performing a connection-oriented communication. In some cases, a session may be initiated or established before data is transferred. As described above, initiation of identity session 434 may comprise displaying a successful login screen or welcome screen with one or more links to resources or apps authorized for use by the user, for instance, which may be indicative of a connection between the user device and the server hosting the app 425.

It should be noted that the identity dataflow 415 may interact with any of the runtime systems illustrated in FIG. 4, and in any order. In some other cases, the identity dataflow 415 may interact with different runtime systems in parallel (e.g., authenticate system 421 and device system 422 simultaneously). In other cases, the identity dataflow 415 may interact with the runtime systems in a first branch (e.g., the left branch in FIG. 4), followed by the runtime systems in the second branch (i.e., right branch). Either way, the discovery agent elements may detect the behavior and configurations of the various identity infrastructure elements and report the same to a centralized server (e.g., shown as system 300-*a* in FIG. 3) or administrator based on intercepting the identity dataflow 415 within the identity infrastructure.

Figure 5:
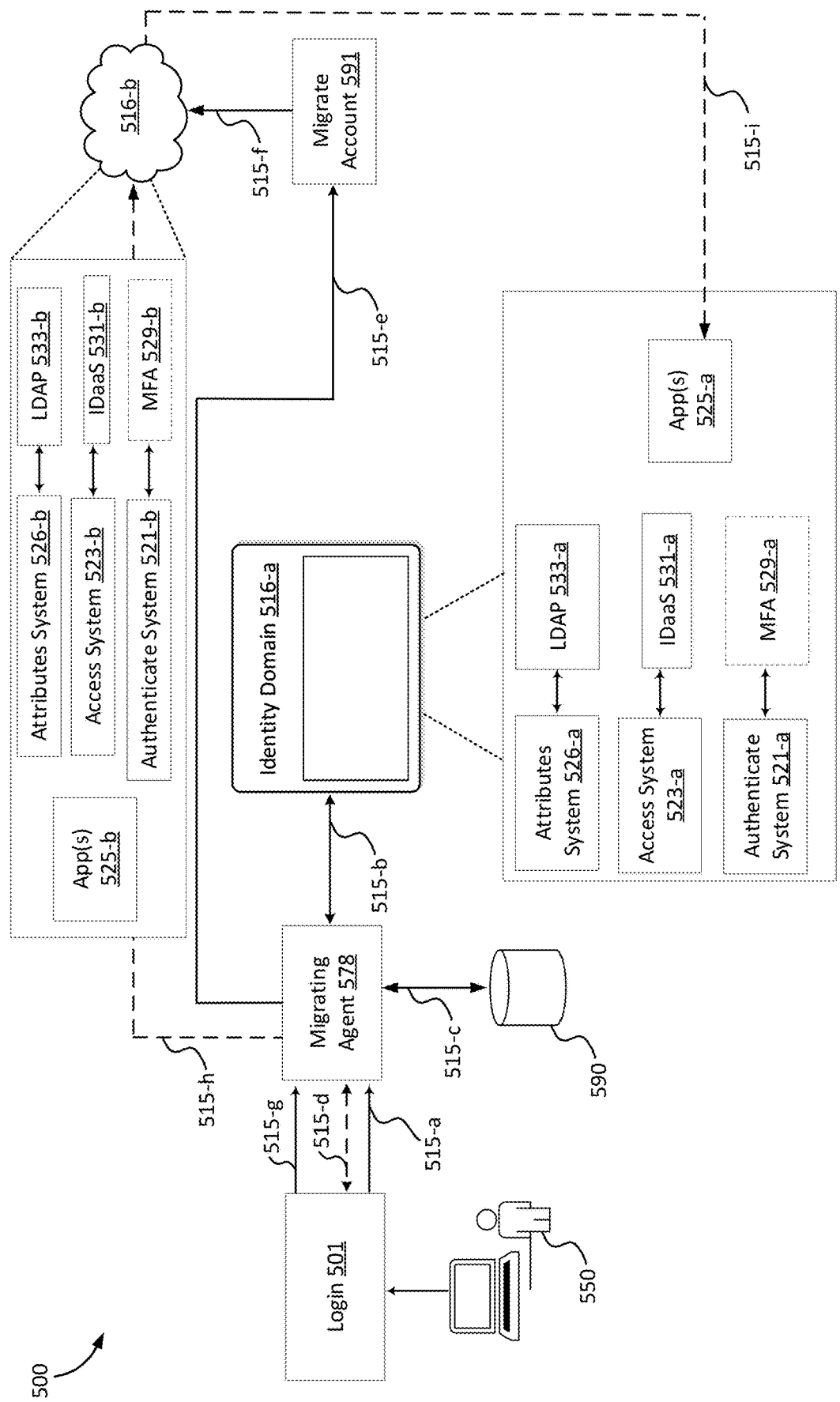
FIG. 5 illustrates a process flow for migrating identity information across identity domains in an identity infrastructure, according to an embodiment of the disclosure.

FIG. 5 illustrates a process flow 500 for migrating identity information across identity domains in an identity infrastructure (e.g., shown as identity infrastructure 301-*a* in FIG. 3A). In some cases, process flow 500 implements one or more aspects of the systems 100 and/or 300 described in relation to FIGS. 1 and 3A-B, respectively. Additionally, or alternatively, process flow 500 implements one or more aspects of process flow 400 described in relation to FIG. 4.

In some cases, an enterprise or organization may utilize one or more identity systems, such as an on-premises identity system and one or more cloud-based identity systems. In such cases, the enterprise may also need to manage identity (e.g., of their employees, their customers, etc.) in multiple locations (e.g., geographic locations, network locations, or a combination). Businesses are increasingly using multiple cloud services (e.g., Amazon Web Services (AWS) provided by Amazon, Inc., of Seattle, WA, Azure AD provided by Microsoft, Corp., of Redmond, WA, Google Cloud Platform (GCP) provided by Alphabet, Inc., of Mountain View, CA), each of which use unique, built-in identity systems. Further, a business or enterprise may wish to migrate applications and/or identity information to the cloud with minimal changes to the apps, how users interact with the apps, etc. For instance, an enterprise using a legacy identity system (e.g., not cloud based) may wish to migrate user accounts from the legacy system to cloud. The legacy identity system may also be referred to as the source identity system and may be currently used to secure access to an application (e.g., an on-premises hosted application). According to aspects of this disclosure, an enterprise may migrate their user identities (or identity information) with minimal user disruption and/or changes to user experience (i.e., how users interact with the apps), as further described below.

In this example, identity information for a user 550 is being migrated across identity domains, for instance, from a first identity domain 516-*a* (i.e., source identity system) to a second identity domain 516-*b* (i.e., destination identity system). The user 550 may be an unmigrated user in the second identity domain. As illustrated, the process flow 500 may comprise receiving a login request 501 in the first identity domain, where the login request 501 may be received from the user 550 as dataflow 515-*a*. In some examples, a migrating agent 578 or another module described in relation to FIG. 1 may proxy the request made by the user. In some cases, the user 550 may be attempting to access the app 525, where the app may be associated with the first identity domain.

The migrating agent 578 or a module (e.g., first identity data identifying module 108 in FIG. 1) may extract from the login request at least one of a user identifier and user credentials information associated with the first user. Further, the migrating agent 578 may identify one or more credential verification resources in the first identity domain to check the user's authentication state, for instance. In some cases, at least one of the user identifier and user credentials information for the user 550 may be verified, where the verifying includes accessing the one or more credential verification resources. Dataflow 515-b represents this verification of the user identifier and/or the user credentials information for the user 550 based on accessing the one or more credential verification resources in the first identity domain.

In some cases, the credential verification resources associated with the first identity domain 516-a may include one or more of the attributes system 526-a, the access system 523-a, and the authenticate system 521-a, which may be similar or substantially similar to the attribute system 426, the access system 423, and the authenticate system 421 previously described in relation to FIG. 4. Further, LDAP 533-a, IdaaS 531-a, and MFA 529-a may implement one or aspects of the LDAP 431, IdaaS 431, and MFA 429, respectively. In some examples, a module (e.g., shown as first identity data identifying module 108 in FIG. 1) may work in conjunction with the authenticate system 521-a to verify at least one of the user identifier and user credentials information for the first user. In some examples, the process of authentication may comprise the user 550 submitting user credentials (e.g., user identifier, password) to the authenticate system 521-a, which then checks the user identifier and password for a match. In some cases, the password may be checked against a locally stored one-way hash of the password. Once the user identifier and password have been verified, an identity session and corresponding identity session token may be created for the user. In some circumstances, verification may be performed against one or more of the user identifier, password, and any other applicable identity data. In some examples, the user identifier may optionally be checked even prior to authentication, for instance, to determine whether the user identifier is valid and corresponds to a user known by the system. In one non-limiting example, the user identifier may be checked by accessing a directory service or database (e.g., LDAP 533-a) and determining whether a user record/profile corresponding to that user identifier exists. Additionally, or alternatively, the credential verification resources may include one or more password verification points, and third-party databases or APIs (e.g., haveibeenpwned.com). As shown, the second identity domain 516-b may also comprise or be associated with one or more of an attributes system 526-b, LDAP 533-b, access system 523-b, IdaaS 531-b, authenticate system 521-b, MFA 529-b, and app(s) 525-b, which may be similar or substantially similar to those previously described in relation to FIG. 4 or any of the other figures described herein.

In some cases, the migrating agent 578 may request, from an external third party, validation of user data for the user 550. For instance, the migrating agent 578 may transmit the request as dataflow 515-c to a compromised accounts database 590. The compromised accounts database 590 may store information related to compromised user data (e.g., user identifier, first and/or last name, last 4 of SSN, etc.). In some cases, user data may be compromised due to a data breach (e.g., hacking). Numerous public and subscription-style services that provide intelligence about users and credentials exist. Some of these intelligence services scan the dark web or monitor breach notifications sent out to users. In some cases, the compromised accounts database 590 may receive information from such intelligence services, for instance, through an API. One non-limiting example of such a service includes the haveibeenpwned database/API maintained by a website of the same name and created by Troy Hunt. Additionally, or alternatively, the intelligence service and/or the compromised accounts database 590 may respond with a risk score, where the risk score may comprise one of a high, medium, or low risk. Alternatively, the risk score may comprise a numeric score on a predefined scale (e.g., out of 10, out of 100, etc.).

In some cases, in response to determining that the user data is compromised, the migrating agent 578 or another module may request the user 550 to modify the user credentials information before a user profile for the user is created in the second identity domain. Dataflow 515-d represents this bi-directional communication between the user 550 and the migrating agent 578 or the system (e.g., shown as system 100 in FIG. 1). For instance, the migrating agent 578 may receive, from the user, modified user identity data within dataflow 515-d, where the modified user identity data comprises modified user credentials information (e.g., a new password). In some cases, the modified user credentials information may be passed on to the first identity domain so that it may be updated via the attributes system 526-a, for instance. In some cases, the modified user credentials information may be passed from the migrating agent 578 to the on-premises system as dataflow 515-b, or another dataflow. The migrating agent 578 may also request additional identity data for the first user from the first identity domain, where the request may be sent within dataflow 515-b. In some cases, additional user credentials information may be obtained before creating a user profile for the user 550 in the second identity domain, where the additional user credentials information may comprise at least multi-factor authentication information (e.g., shown as MFA 529-b). MFA 529 (e.g., MFA 529-a, 529-b) may allow an added level of security, for instance, to verify that the user is who they say they are, before migrating their identity information to the second identity domain. In some circumstances, MFA serves to mitigate the chances of incorrectly replicating a user profile in the second identity domain. In some examples, MFA 529 may be implemented using a mobile authenticator app installed on a user device (e.g., smartphone) that generates a numeric or alphanumeric pin (e.g., 4 digits long, 6 characters long, etc.), a physical device (e.g., a USB token that requires biometric interaction, such as touch, a fingerprint, etc., as proof of possession), and a push notification sent to a registered mobile device to name a few non-limiting examples. Other techniques for implementing MFA 529 known in the art, such as a code or pin sent over SMS or email, are also contemplated in different embodiments.

In some cases, the migrating agent 578 may proceed to create 591 a user profile for the user 550 in the second identity domain 516-b. At least a part of the user profile in the second identity domain is associated with one or more of the verified user identifier(s) associated with the first user, the verified user credentials information associated with the first user, and any additional identity data for the first user. In some circumstances, the second identity domain may have different requirements for the information needed to create a user record (or user profile) as compared to the first identity domain. For instance, the first and second identity domains may be different with regards to their mandatory user attributes (e.g., first identity domain requires a secondary email address, while the second identity domain requires a secondary phone number), format and/or syntax of those attributes (e.g., first identity domain only accepts phone numbers in (123)456-789 format, and the second identity domain only accepts phone numbers in 123456789 format), and how a user is activated (e.g., via email, push notification on a registered device, such as a smartphone, voice call, text or SMS, etc.), to name a few non-limiting examples. The migrating agent 578 may ingest, interpret, and resolve any inconsistencies or discrepancies between the different requirements for the two identity domains prior to migrating the user. In some cases, the migrating agent 578 or another module may interact with one or more identity domain elements in the second identity domain, for example, using a public API, to determine the minimum or mandatory set of attributes required to create a valid user profile (or user record) in the second identity domain, a format and/or syntax for the attributes, or any other applicable information specific to the second identity domain. As an example, the source identity system (i.e., first identity domain) may require an alternate email address and an alternate phone number, while the destination identity system (i.e., second identity domain) may only require an alternate email address. In such cases, the migrating agent 578 may determine that the alternate phone number can be skipped when creating a user profile for the first user in the second identity domain For example, the migrating agent 578 or another module may specify one or more requirements for defining and storing user data in the second identity domain before creating a user profile for the user 550 in the second identity domain, wherein the user data comprises one or more of the user identifier, the user credentials information, and the additional identity data. Dataflows 515-e and 515-f represent the migrating agent 578 creating the user profile and/or configuring the one or more requirements for defining and storing user data in the second identity domain. Additionally, or alternatively, the migrating agent 578 may determine whether at least a portion of the user credentials information may be utilized in the second identity domain before creating a user profile for the first user in the second identity domain by entering the at least a portion of the user credentials in the second domain and ascertaining whether the at least a portion of the user credentials comply with one or more second identity domain rules.

Once the user profile for the user 550 has been created in the second identity domain 516-b, future login requests 501 from the user to access apps 525-a associated with the first identity domain 516-a may be authenticated using the user's cloud identity associated with the second identity domain, for example. Dataflows 515-g and 515-h represents this scenario where the migrating agent or another module intercepts future login requests and redirects them to the second identity domain based in part on detecting that the user 550 has migrated to the second identity domain. After authentication by the second identity domain 516-b, the user 550 may be provided access to the app 525-a (shown as dataflow 515-i). In some cases, the dataflow 515-i may pass through the migrating agent or another module of the system before the user 550 is granted access to the app 525-a. For instance, the system may evaluate access policies for the app 525-a and calculate attribute values to be included in HTTP headers forwarded to the app 525-a. Additionally or alternatively, after migration, future login requests from the user to access apps 525-b associated with the second identity domain 516-b may be authenticated using the user's cloud identity associated with the second identity domain (shown as dataflows 515-g and 515-h).

FIG. 6A illustrates a process flow 600-a for synchronizing identity information across identity domains in an identity infrastructure, according to an embodiment of the disclosure. The identity infrastructure may implement one or more aspects of the distributed identity infrastructure 301-a, previously described in relation to FIG. 3A. In some cases, a user 650 may be associated with a first identity domain 616-a and optionally a second identity domain 616-b. For instance, the user 650 may have previously been migrated from the first identity domain 616-a to the second identity domain 616-b, as previously described in FIG. 5. In some cases, process flow 600-a implements one or more aspects of the systems 100 and/or 300 described in relation to FIGS. 1 and 3A-B, respectively. Additionally, or alternatively, process flow 600 implements one or more aspects of process flows 400 and/or 500 described in relation to FIGS. 4 and/or 5.

In this example, identity information for the user 650 is being synchronized between identity domains 616-a and 616-b, for instance, in response to a request to change identity data and/or identity metadata in the first identity domain 616-a. As illustrated, the process flow 600-a may begin by receiving a login request 601 in the first identity domain, where the login request 601 may be received from the user 650 as dataflow 615-a. In some examples, a synchronizing agent 628 or another module described in relation to FIG. 1 may proxy the request made by the user. In some cases, the login request may comprise a request to change at least one of first identity data and first identity data for the user 650. As shown, the synchronizing agent 628 may intercept the request to change the first identity data and/or metadata. Further, the synchronizing agent 628 or another module may identify one or more modifications in the first identity data and/or metadata, and evaluate a compatibility of the modifications with respect to identity information requirements in the second identity domain 616-b. As noted above, different identity domains may have different requirements with respect to credential requirements (e.g., password length, required characters, etc.), attributes requirements (e.g., mandatory attributes), policy requirements (e.g., time-based policy stating that users can only login between 6 am and 10 pm), etc. In this example, the first identity domain 616-a may be associated with one or more first credentials, first attributes, and first policy rules for the user 650. Further, the user 650 may be associated with one or more of first identity data and first identity metadata. In some cases, the second identity domain 616-b may be associated with one or more second credentials, second attributes, and/or second policy rules for the user 650. The user 650 may have a relation or presence in the second identity domain, for instance, a user profile. The user profile in the second identity domain may be associated with at least one of second identity data and second identity metadata for the user 650. It should be noted that, one or more of the first credentials and second credentials, first attributes and second attributes, and first policy rules and second policy rules may be equivalent, for example, based on a previous migration of the user.

In some cases, the one or more second credentials may comprise one or more second credentials requirements; the one or more second attributes may comprise one or more second attributes requirements; and/or the one or more second policy rules may comprise one or more second policy rules requirements. In some embodiments, using the synchronizing agent 628 to evaluate a compatibility of the first identity data and/or first identity metadata modifications to the second identity domain 616-b may comprise comparing the requested changes to the first identity data and metadata to one or more of the second credentials requirements, second attributes requirements, and second policy rules requirements. Dataflow 615-*b* depicts the synchronizing agent 628 accessing information related to credentials requirements, attributes requirements, and/or policy rules requirements specific to the second identity domain 616-*b*. As shown, the second identity domain 616-*b* may comprise one or more identity domain elements and/or runtime systems, such as an attributes system 626-*b*, an access system 623-*b*, an authenticate system 621-*b*, LDAP 633-*b*, IDaaS 631-*b*, MFA 629-*b*, and protected resources or app(s) 625-*b*. In some examples, the credential requirements may comprise at least one of a credential length and a credential character set. One non-limiting example of a credential comprises a password. Other types of credentials and/or credential requirements are contemplated in different embodiments. In some examples, the attributes requirements may comprise one or more of a government-issued alphanumeric string associated with the user 650, such as a Social Security Number (SSN), Driver License Number, State ID Number, Tax ID Number, and/or Passport Number, to name a few non-limiting examples. In some cases, the attributes requirements may also include information pertaining to an identified user group (e.g., user 650 is a member of admin group, user 650 is a member of sales group, etc.), if any. In yet other cases, the attributes requirements may comprise a telephone number (e.g., mobile or cellphone number), an employee ID number, or any other applicable information. In some embodiments, the policy rules may comprise a time-based rule. For instance, the policy rules requirements may comprise policy rules based on OKTA identity domain requirements. Other types of policy rules requirements, including policy rules based on different identity domain requirements (e.g., Active Directory (AD) identity domain requirements) are contemplated in different embodiments.

After comparing the requested changes to the first identity data and/or metadata to the one or more requirements in the second identity domain, the synchronizing agent 628 or another module of the system may ensure suitability of the requested changes in the second identity domain. In some cases, ensuring suitability may comprise confirming the requested changes meet the one or more second credentials requirements, second attributes requirements, and/or second policy rules requirements. As shown by dataflows 615-*c*, 615-*d*, and 615-*e*, the synchronizing agent 628 may communicate with one or more of the first identity domain 616-*a* and the user 650 prior to or during synchronization between the first and the second identity domain. For example, the synchronizing agent 628 or another module of the system may change the first identity data and/or first identity metadata for the user 650 from one or more first identity domain first values to one or more first identity domain second values in the first identity domain 616-*a*, as shown by dataflow 615-*c*. In some examples, the first identity domain 616-*a* may be associated with a first identity domain format, while the second identity domain 616-*b* may be associated with a second identity domain format. In some circumstances, the synchronizing agent 628 may identify that at least a portion of the modifications in the first identity domain are incompatible with the requirements for the second identity domain. In some examples, the synchronizing agent 628 may prompt the user to 650 to make one or more changes to the originally proposed modifications, as shown by dataflow 615-*d* (shown as optional by the dashed lines). For example, the synchronizing agent may prompt the user to change a credential or password length, so the updated password meets the requirements for both the first and the second identity domain. In another example, the synchronizing agent 628 may notify the user that the second identity domain needs an uppercase letter in the password. In such cases, the user 650 may update their password by adding an uppercase letter or replacing one of the lowercase letters with an uppercase, for instance. Dataflow 615-*e* depicts this communication between the user 650 and the synchronizing agent 628. After receiving dataflow 615-*e*, for instance, with the updated modifications to the first identity data and/or first identity metadata, the synchronizing agent 628 or another module may update identity information in the first identity domain with one or more new identity domain values. In some cases, the one or more new identity domain values for the first identity domain may be received within dataflow 615-*c*. Further, the synchronizing agent 628 may synchronize 691 an account or user profile for the user 650 in the second identity domain based in part on the new identity domain values (i.e., first identity domain second values). Dataflows 615-*f* and 615-*g* represent the synchronizing agent 628 updating at least one of second identity data and second identity metadata in the second identity domain 616-*b*. In some examples, the updating may comprise changing one or more second identity domain first values to one or more second identity domain second values. The one or more second identity domain second values may be in a second identity domain format and may be equivalent to the one or more first identity domain second values.

Figure 6B:
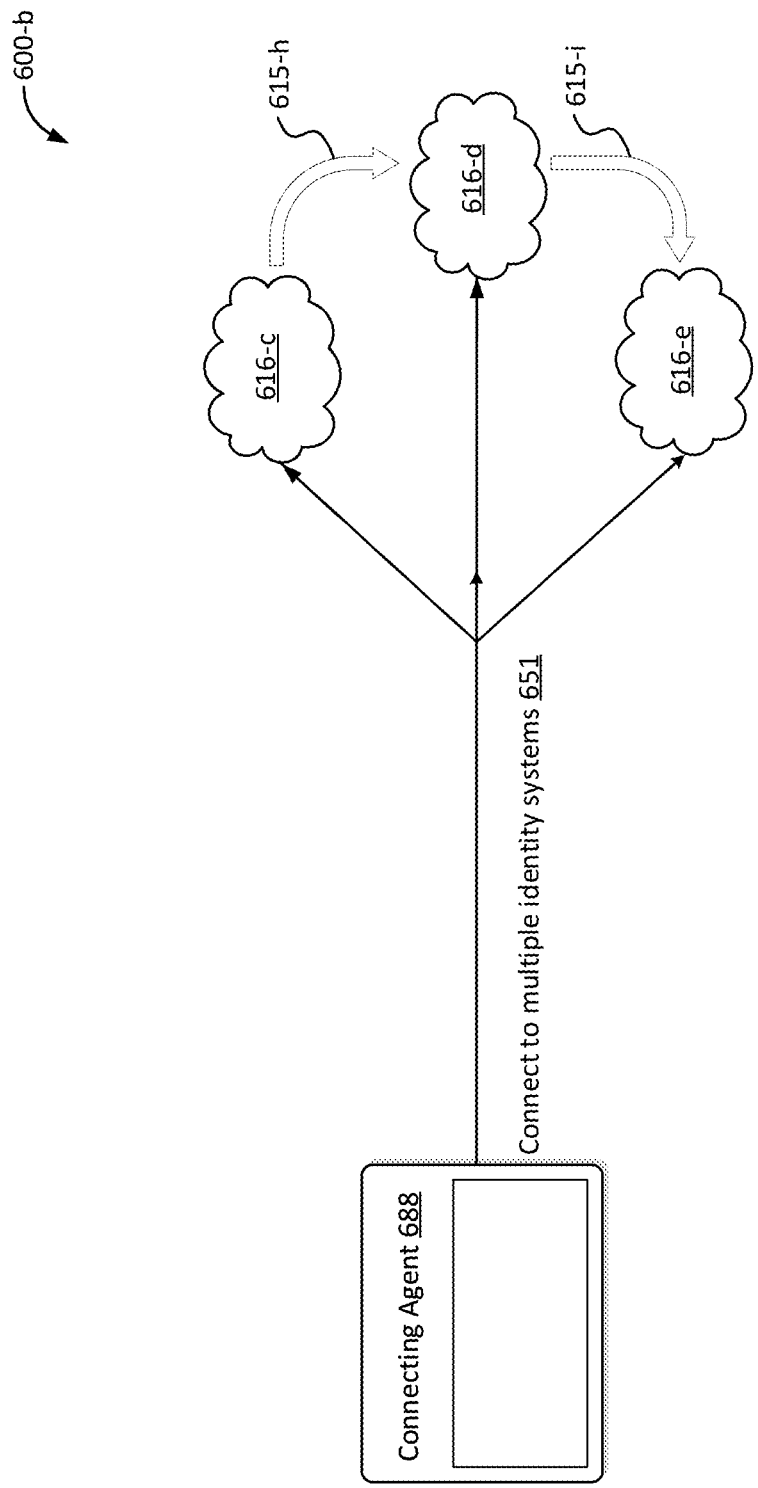
FIG. 6B illustrates a process flow for integrating identity data across multiple identity domains, according to an embodiment of the disclosure.

FIG. 6B illustrates a process flow 600-*b* for integrating identity data across multiple identity systems (e.g., identity systems 316 seen in FIG. 3A), according to an embodiment of the disclosure. In some cases, the system of the present disclosure may allow an enterprise or organization to connect 651 multiple identity domains or identity systems 616 (e.g., identity system 616-*c*, identity system 616-*d*, identity system 616-*e*) using at least one connecting agent 688 (also referred to as a connector). The connecting agent 688 may implement one or more aspects of the connecting agent 388 previously described in relation to FIG. 3B and elsewhere herein. As shown, the at least one connecting agent 688 may be used to connect 651 to the multiple identity systems and may transition identity data and/or identity metadata between identity systems. In some other cases, there may be a connecting agent for each of the different identity systems 616. In some cases, the connecting agent 688 may be a general purpose last-mile connector and may support (i.e., work with) a plurality of applications (e.g., web apps) running on different cloud platforms or identity systems 616. In some other cases, the connecting agent 688 may be an on-premises identity connector and may work with SYMANTEC SITEMINDER provided by Broadcom, Inc., of San Jose, CA, ORACLE ACCESS MANAGER (OAM) provided by Oracle Corporation of Austin, TX, ACTIVE DIRECTORY (AD) provided by Microsoft Inc., of Redmond, WA, PING FEDERATE/ACCESS provided by Ping Identity Corporation of Denver, CO, WS02 provided by WS02 of Colombo, Sri Lanka, to name a few non-limiting examples. In yet other cases, the connecting agent 688 may be a cloud identity connector and may work with OKTA provided by Okta, Inc., of San Francisco, CA, AZURE AD provided by Microsoft Inc., of Redmond, WA, AWS IDENTITY provided by Amazon, Inc., of Seattle, WA, GCP IDENTITY provided by Alphabet, Inc., of Mountain View, CA, to name a few non-limiting examples.

The connecting agent 688 may support workflows and may be deployed for helping with identity integration across identity systems 616, such as identity migration, last mile single sign on (SSO), session abstraction, identity replication (e.g., replicate user authorization policies to apps or resources deployed on different identity systems to ensure consistency), and/or identity data and/or metadata synchronization across identity domains (e.g., legacy or on-premises, cloud-based). In some cases, the connecting agent may work in conjunction with a migrating agent (e.g., shown as migrating agent 378 in FIG. 3B, migrating agent 578 in FIG. 5), a synchronization agent (e.g., synchronization agent 628 in FIG. 6A), or any other module or agent of the system (e.g., shown as system 100 in FIG. 1, system 300-*a* in FIG. 3A). In some cases, last mile SSO or last mile integration refers to an application connection, which ultimately presents the application to the user. For instance, after user authentication (e.g., via a security token), the user may be provided access to the protected application via the last-mile connection between a server, such as a federation server (e.g., a server placed behind a firewall in an organization to authenticate user credentials) or another server (e.g., operated by a cloud platform hosting the app) and the application. In some cases, the user may be presented to the application which then creates (or initiates) a session and renders the application for the authenticated user.

In current techniques, apps integrated with legacy identity systems, such as an on-premises identity system, may need to be rewritten to work with a new identity system, such as a cloud-based identity system. However, according to aspects of the present disclosure, identity information migration, app migration, and/or workflow actions, such as user authentication, session creation, etc., may be performed through migrating agents, connecting agents 688, etc., which may integrate with a plurality of identity systems 616. In some cases, the migrating agent may incrementally migrate identity information from one identity domain to another. Incremental migration of identity information may not only facilitate in early identification and fixing of errors (i.e., before all identity information with the same or similar errors are migrated to the destination identity domain) but may also allow at least a portion of users to continue accessing the source and/or destination identity domains.

In some cases, the connecting agent 688 may facilitate configuring workflows for identity integration, which may enable apps to be run across different identity systems. For example, migration may necessitate two or more disparate identity systems having fundamental incompatibilities to coexist and function together. In such cases, one or more independently operating workflows, such as authentication, user profile creation, user profile updates, etc., may overlap in the two identity systems. In some instances, these independently operating workflows may need to interoperate to ensure consistency between the different identity systems or domains. The connecting agent 688 may work in conjunction with one or more discovery agents (e.g., shown as discovery agents 305 in FIG. 3A) and use the data extracted from the discovery process to enable coexistence of the disparate identity systems. In some aspects, coexisting workflows may be attainable using such a design since it may allow different apps to use different capabilities of the two or more identity systems. In some cases, the workflow may comprise one or more of user authentication, session creation, connecting identity to app, etc.

In some cases, connectors 688 may serve to accelerate deployment of, and facilitate the running of, apps at different geographic locations and on different identity management systems or cloud platforms. For example, the connector 688 may allow a user (i.e., client, administrator, etc.) to switch between identity platforms (i.e., identity systems 616) and/ or enable identity data and associated identity data requests to be moved between different geographic regions or regulatory areas, shown by arrow signs 615-*h* and 615-*i* in FIG. 6B. In some cases, different geographic regions or regulatory areas may enforce different identity regulatory constraints (e.g., General Data Protection Regulation (GDPR) in the EU). Additionally, or alternatively, the at least one connecting agent 688 may allow the enterprise or organization to manage identity and access for apps running on the multiple identity systems 616 with a single interface. For instance, identities may be integrated (e.g., through migration, synchronization) across the different identity systems 616 (e.g., in the cloud, on-prem, hybrid, etc.) to enforce consistent policies (e.g., shown by the arrow signs 615-*h*, 615-*i*). In some other cases, the at least one connecting agent 688 may also allow an enterprise to manage identity and access for apps running on multiple identity systems 616, while providing the same or substantially the same user experience as before migration. That is, to a user, such as an employee or client, using the apps, it may appear that the underlying identity systems 616 and their behavior is substantially unchanged. As used herein, migration refers to the process of entering identity information (e.g., user identifier, user credentials information, etc.) for a user from a first identity domain (e.g., source identity system) into a second identity domain (e.g., destination identity system), for instance, when there is no user profile for the user in the second identity domain. In such cases, the user may be referred to as an unmigrated user in the second identity domain. In some aspects, migration may refer to the process of generating a similar or substantially similar user profile for the user in the second identity domain based on an existing user profile for the user in the first identity domain.

In some cases, the user may have a presence in both a first and a second identity domain, for instance, if the user had previously been migrated into the second identity domain. Further, identity data and/or identity metadata for the user in the first identity domain may be modified or changed. A password update by the user in the first identity domain may be an example of such a change. In some cases, these changes may be propagated to the second identity domain, for instance, to allow the user to access resources associated with both the first and the second identity domain using the same identity information. In some examples, synchronization may refer to the process of detecting changes to identity data and/or identity metadata in a first domain and applying those same changes to a second identity domain. Although not necessary, in some circumstances, migration of identity information may precede synchronization.

Figure 7:
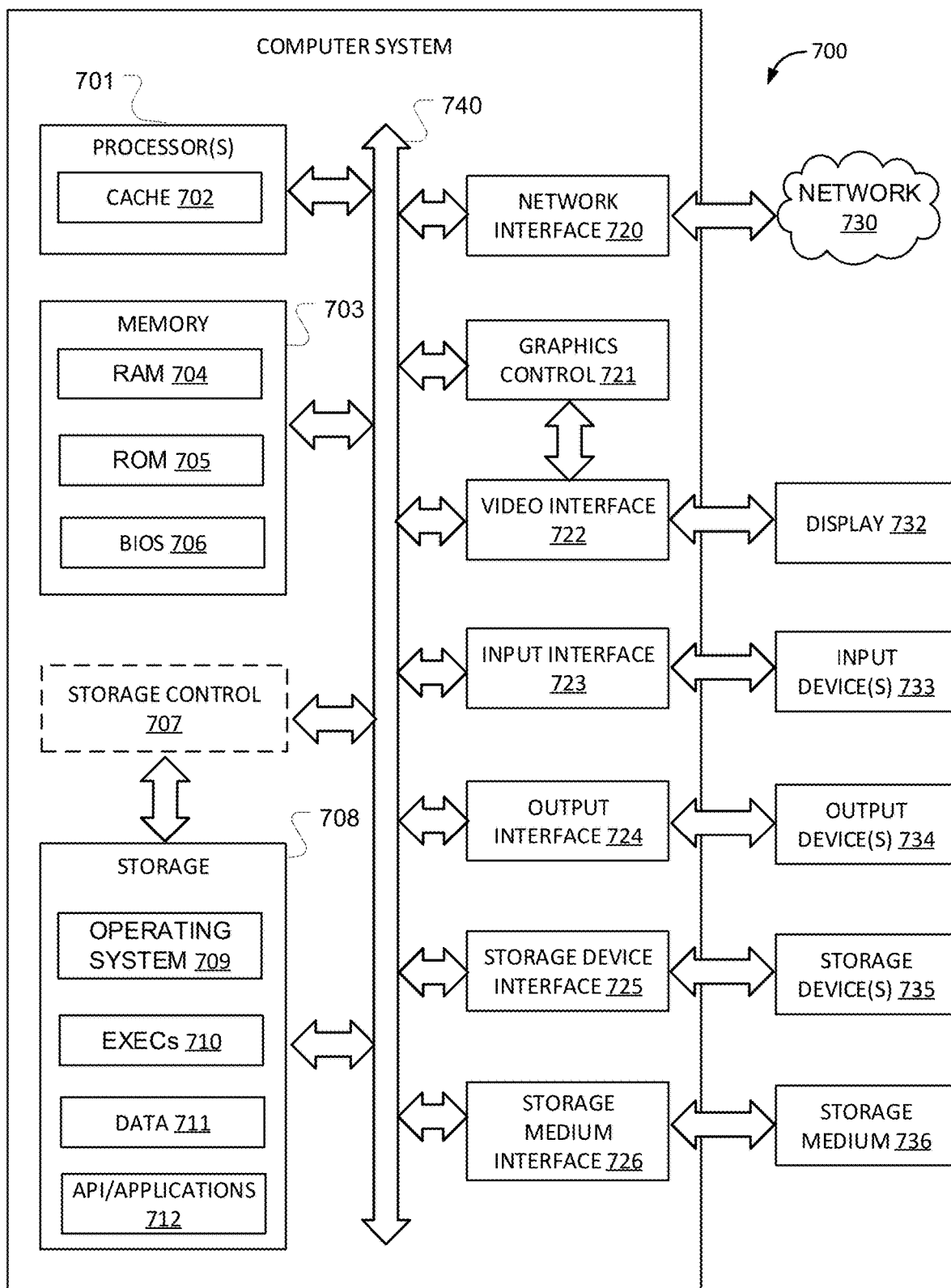
FIG. 7 is a block diagram depicting an exemplary machine that includes a computer system within which a set of instructions can be executed for causing a device to perform or execute any one or more of the aspects and/or methodologies of the present disclosure.

FIG. 7 illustrates a diagrammatic representation of one embodiment of a computer system 700, within which a set of instructions can execute for causing a device to perform or execute any one or more of the aspects and/or methodologies of the present disclosure. The components in FIG. 7 are examples only and do not limit the scope of use or functionality of any hardware, software, firmware, embedded logic component, or a combination of two or more such components implementing particular embodiments of this disclosure. Some or all of the illustrated components can be part of the computer system 700. For instance, the computer system 700 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 700 includes at least a processor 701 such as a central processing unit (CPU) or a graphics processing unit (GPU) to name two non-limiting examples. In some cases, the processor 701 may comprise a cache 702. Any of the subsystems described throughout this disclosure could embody the processor 701. The computer system 700 may also comprise a memory 703 and a storage 708, both communicating with each other, and with other components, via a bus 740. The bus 740 may also link a display 732, one or more input devices 733 (which may, for example, include a keypad, a keyboard, a mouse, a stylus, etc.), one or more output devices 734, one or more storage devices 735, and various non-transitory, tangible computer-readable storage media 736 with each other and/or with one or more of the processor 701, the memory 703, and the storage 708. All of these elements may interface directly or via one or more interfaces or adaptors to the bus 740. For instance, the various non-transitory, tangible computer-readable storage media 736 can interface with the bus 740 via storage medium interface 726. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 701 (or central processing unit(s) (CPU(s))) optionally contains a cache or cache memory unit 702 for temporary local storage of instructions, data, or computer addresses. Processor(s) 701 are configured to assist in execution of computer-readable instructions stored on at least one non-transitory, tangible computer-readable storage medium. Computer system 700 may provide functionality as a result of the processor(s) 701 executing software embodied in one or more non-transitory, tangible computer-readable storage media, such as memory 703, storage 708, storage devices 735, and/or tangible computer-readable storage medium 736 (e.g., read only memory (ROM)). Memory 703 may read the software from one or more other non-transitory, tangible computer-readable storage media (such as mass storage device(s) 735, storage medium 736) or from one or more other sources through a suitable interface, such as network interface 720. Any of the subsystems herein disclosed could include a network interface such as the network interface 720. The software may cause processor(s) 701 to carry out one or more processes or one or more steps of one or more processes described or illustrated herein. Carrying out such processes or steps may include defining data structures stored in memory 703 and modifying the data structures as directed by the software. In some embodiments, an FPGA can store instructions for carrying out functionality as described in this disclosure. In other embodiments, firmware includes instructions for carrying out functionality as described in this disclosure.

The memory 703 may include various components (e.g., non-transitory, tangible computer-readable storage media) including, but not limited to, a random-access memory component (e.g., RAM 704) (e.g., a static RAM "SRAM", a dynamic RAM "DRAM, etc.), a readonly component (e.g., ROM 705), and any combinations thereof. ROM 705 may act to communicate data and instructions unidirectionally to processor(s) 701, and RAM 704 may act to communicate data and instructions bidirectionally with processor(s) 701. ROM 705 and RAM 704 may include any suitable non-transitory, tangible computer-readable storage media. In some instances, ROM 705 and RAM 704 include non-transitory, tangible computer-readable storage media for carrying out a method. In one example, a basic input/output system 706 (BIOS), including basic routines that help to transfer information between elements within computer system 700, such as during start-up, may be stored in the memory 703.

Fixed storage 708 is connected bi-directionally to processor(s) 701, optionally through storage control unit 707. Fixed storage 708 provides additional data storage capacity and may also include any suitable non-transitory, tangible computer-readable media described herein. Storage 708 may be used to store operating system 709, EXECs 710 (executables), data 711, API applications 712 (application programs), and the like. Often, although not always, storage 708 is a secondary storage medium (such as a hard disk) that is slower than primary storage (e.g., memory 703). Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with computer system 700 (e.g., via an external port connector (not shown)) via a storage device interface 725. Particularly, storage device(s) 735 and an associated machine-readable medium may provide nonvolatile and/or volatile storage of machine-readable instructions, data structures, program modules, and/or other data for the computer system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 700 may also include an input device 733. In one example, a user of computer system 700 may enter commands and/or other information into computer system 700 via input device(s) 733. Examples of an input device(s) 733 include, but are not limited to, an alpha-numeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when computer system 700 is connected to network 730, computer system 700 may communicate with other devices, such as mobile devices and enterprise systems, connected to network 730. Communications to and from computer system 700 may be sent through network interface 720. For example, network interface 720 may receive incoming communications (such as requests or responses from other devices) in the form of one or more packets (such as Internet Protocol (IP) packets) from network 730, and computer system 700 may store the incoming communications in memory 703 for processing. Computer system 700 may similarly store outgoing communications (such as requests or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 (also referred to as network segment 730) include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 730, may employ a wired and/or a wireless mode of communication. In general, any network topology may be used.

Information and data can be displayed through a display 732. Examples of a display 732 include, but are not limited to, a liquid crystal display (LCD), an organic liquid crystal display (OLED), a cathode ray tube (CRT), a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721. In addition to a display 732, computer system 700 may include one or more other peripheral output devices 734 including, but not limited to, an audio speaker, a printer, a check or receipt printer, and any combinations thereof. Such peripheral output devices may be connected to the bus 740 via an output interface 724. Examples of an output interface 724 include, but are not limited to, a serial port, a parallel connection, a USB port, a FIREWIRE port, a THUNDERBOLT port, and any combinations thereof.

In addition, or as an alternative, computer system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 700 shown in FIG. 7 such as, but not limited to, the network 730, processor 701, memory, 703, etc., may comprise a cloud computing system. In one such system, front-end systems such as input devices 733 may provide information to back-end platforms such as servers (e.g., computer systems 700) and storage (e.g., memory 703). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for synchronizing identity information across identity domains in an identity infrastructure, the system comprising:
one or more hardware processors configured by machine-readable instructions to:
identify at least one of first identity data and first identity metadata in a first identity domain;
identify at least one of second identity data and second identity metadata in a second identity domain;
receive a request to change the at least one of first identity data and first identity metadata for at least one user; and
update the at least one of second identity data and second identity metadata for the at least one user, wherein the updating is based at least in part on the request to change the at least one of the first identity data and the first identity metadata for the at least one user.

2. The system of claim 1, wherein the identity infrastructure comprises a synchronizing agent; and
wherein receiving a request to change the at least one of the first identity data and first identity metadata further comprises using the synchronizing agent to:
intercept the request to change the at least one of the first identity data and the first identity metadata,
process the at least one of the first identity data and the first identity metadata,
identify one or more modifications in the at least one of the first identity data and the first identity metadata, and
evaluate a compatibility of the one or more modifications in the at least one of the first identity data and the first identity with respect to the second identity domain.

3. The system of claim 2, wherein one or more first credentials, first attributes, and first policy rules are associated with the first identity domain;
wherein one or more second credentials, second attributes, and second policy rules are associated with the second identity domain;
wherein the one or more second credentials comprise one or more second credentials requirements;
wherein the one or more second attributes comprise one or more second attributes requirements;
wherein the one or more second policy rules comprise one or more second policy rules requirements;
wherein using the synchronizing agent to evaluate the compatibility of the one or more modifications comprises: comparing the requested changes to the at least one of the first identity data and the first identity metadata to the one or more second credentials requirements;
wherein using the synchronizing agent to evaluate the compatibility of the one or more modifications comprises: comparing the requested changes to the at least one of the first identity data and the first identity metadata to the one or more second attributes requirements; and
wherein using the synchronizing agent to evaluate the compatibility of the one or more modifications comprises: comparing the requested changes to the at least one of the first identity data and the first identity metadata to the one or more second policy rules requirements.

4. The system of claim 3, wherein one or more of the first credentials and the second credentials comprise a respective password;
wherein the one or more second credential requirements comprise at least one of a credential length and a credential character set;
wherein the one or more second attributes requirements comprise one or more of an alphanumeric string and an identified user group associated with the at least one user;
wherein one or more of the first policy rules and the second policy rules comprise a respective time-based rule;
wherein the one or more second policy rules requirements comprise policy rules based on second identity domain requirements,
wherein the one or more hardware processors are further configured by machine-readable instructions to: ensure suitability of the requested changes to the at least one of the first identity data and the first identity metadata with respect to the second identity domain by confirming the requested changes meet the one or more second credentials requirements, second attributes requirements, and second policy rules requirements.

5. The system of claim 3, wherein the one or more hardware processors are further configured by machine-readable instructions to transmit a request to the first identity domain to reverse the changes to the at least one of the first identity data and the first identity metadata, wherein the request to reverse the changes is based at least in part on the compatibility evaluation by the synchronizing agent.

6. The system of claim 3, wherein the one or more hardware processors are further configured by machine-readable instructions to deny application of the request to change the at least one of the first identity data and the first identity metadata for the at least one user based in part on the compatibility evaluation by the synchronizing agent.

7. The system of claim 1, wherein the one or more hardware processors are further configured by machine-readable instructions to:
change the at least one of the first identity data and the first identity metadata for the at least one user from one or more first identity domain first values to one or more first identity domain second values, wherein the one or more first identity domain first values and the one or more first identity domain second values are in a first identity domain format;
update the at least one of the second identity data and the second identity metadata, wherein the updating comprises changing the at least one of the second identity data and the second identity metadata from one or more second identity domain first values to one or more second identity domain second values by synchronizing the at least one of the second identity data and the second identity metadata to the one or more first identity domain second values, wherein the one or more second identity domain first values and one or more second identity domain second values are in a second identity domain format, and wherein the second identity domain format is different than the first identity domain format.

8. A method for synchronizing identity information across identity domains in an identity infrastructure, comprising:
identifying at least one of first identity data and first identity metadata in a first identity domain;
identifying at least one of second identity data and second identity metadata in a second identity domain;
receiving a request to change the at least one of first identity data and first identity metadata for at least one user; and
updating the at least one of second identity data and second identity metadata for the at least one user, wherein the updating is based at least in part on the request to change the at least one of the first identity data and the first identity metadata for the at least one user.

9. The method of claim 8, wherein the identity infrastructure comprises a synchronizing agent; and
wherein receiving a request to change the at least one of the first identity data and then first identity metadata further comprises using the synchronizing agent to: intercept the request to change the at least one of the first identity data and the first identity metadata, process the at least one of the first identity data and the first identity metadata, identify one or more modifications in the at least one of the first identity data and the first identity metadata, and evaluate a compatibility of the one or more modifications in the at least one of the first identity data and the first identity metadata with respect to the second identity domain.

10. The method of claim 9, wherein one or more first credentials, first attributes, and first policy rules are associated with the first identity domain;
wherein one or more second credentials, second attributes, and second policy rules are associated with the second identity domain;
wherein the one or more second credentials comprise one or more second credentials requirements;
wherein the one or more second attributes comprise one or more second attributes requirements;
wherein the one or more second policy rules comprise one or more second policy rules requirements;
wherein using the synchronizing agent to evaluate the compatibility of the one or more modifications comprises: comparing the requested changes to the at least one of the first identity data and first identity metadata to the one or more second credentials requirements;
wherein using the synchronizing agent to evaluate the compatibility of the one or more modifications comprises: comparing the requested changes to the at least one of the first identity data and the first identity metadata to the one or more second attributes requirements; and
wherein using the synchronizing agent to evaluate the compatibility of the one or more modifications comprises: comparing the requested changes to the at least one of the first identity data and the first identity metadata to the one or more second policy rules requirements.

11. The method of claim 10, wherein one or more of the first credentials and the second credentials comprise a respective password;
wherein the one or more second credential requirements comprise at least one of a credential length and a credential character set;
wherein the one or more second attributes requirements comprise one or more of an alphanumeric string and an identified user group associated with the at least one user;
wherein one or more of the first policy rules and the second policy rules comprise a respective time-based rule;
and wherein the one or more second policy rules requirements comprise policy rules based on second identity domain requirements,
the method further comprising:
ensuring suitability of the requested changes to the at least one of the first identity data and the first identity metadata with respect to the second identity domain by confirming the requested changes meet the one or more second credentials requirements, second attributes requirements, and second policy rules requirements.

12. The method of claim 10, further comprising transmitting a request to the first identity domain to reverse the changes to the at least one of the first identity data and the first identity metadata, wherein the request to reverse the changes is based at least in part on the compatibility evaluation by the synchronizing agent.

13. The method of claim 10, further comprising denying application of the request to change the at least one of the first identity data and the first identity metadata for the at least one user based in part on the compatibility evaluation by the synchronizing agent.

14. The method of claim 8, further comprising:
changing the at least one of the first identity data and the first identity metadata for at least one user from one or more first identity domain first values to one or more first identity domain second values, wherein the one or more first identity domain first values and the one or more first identity domain second values are in a first identity domain format;
updating the at least one of the second identity data and the second identity metadata, wherein the updating comprises changing the at least one of the second identity data and the second identity metadata from one or more second identity domain first values to one or more second identity domain second values by synchronizing the at least one of the second identity data and the second identity metadata to the one or more first identity domain second values, wherein
the one or more second identity domain first values and one or more second identity domain second values are in a second identity domain format, and wherein
the second identity domain format is different than the first identity domain format.

15. A non-transient computer-readable storage medium having instructions embodied thereon, the instructions being executable by one or more processors to perform a method for synchronizing identity information across identity domains in an identity infrastructure, the method comprising:
identifying at least one of first identity data and first identity metadata in a first identity domain;
identifying at least one of second identity data and second identity metadata in a second identity domain;
receiving a request to change the at least one of the first identity data and the first identity metadata for at least one user; and updating the at least one of second identity data and the second identity metadata for the at least one user, wherein the updating is based at least in part on the request to change the at least one of the first identity data and the first identity metadata for the at least one user.

16. The computer-readable storage medium of claim 15, wherein the identity infrastructure comprises a synchronizing agent; and
wherein receiving a request to change the at least one of the first identity data and first identity metadata further comprises using the synchronizing agent to: intercept the request to change the at least one of the first identity data and the first identity metadata, process the at least one of the first identity data and the first identity metadata, identify one or more modifications in the at least one of the first identity data and the first identity metadata, and evaluate a compatibility of the one or more modifications in the at least one of the first identity data and the first identity metadata with respect to the second identity domain.

17. The computer-readable storage medium of claim 16, wherein one or more first credentials, first attributes, and first policy rules are associated with the first identity domain;
wherein one or more second credentials, second attributes, and second policy rules are associated with the second identity domain;
wherein the one or more second credentials comprise one or more second credentials requirements;
wherein the one or more second attributes comprise one or more second attributes requirements;
wherein the one or more second policy rules comprise one or more second policy rules requirements;
wherein using the synchronizing agent to evaluate the compatibility of the one or more modifications comprises: comparing the requested changes to the at least one of the first identity data and the first identity metadata to the one or more second credentials requirements;
wherein using the synchronizing agent to evaluate the compatibility of the one or more modifications comprises: comparing the requested changes to the at least one of the first identity data and the first identity metadata to the one or more second attributes requirements; and
wherein using the synchronizing agent to evaluate the compatibility of the one or more modifications comprises: comparing the requested changes to the at least one of the first identity data and first identity metadata to the one or more second policy rules requirements.

18. The computer-readable storage medium of claim 17, wherein one or more of the first credentials and the second credentials comprise a respective password;
wherein the one or more second credential requirements comprise at least one of a credential length and a credential character set;
wherein the one or more second attributes requirements comprise one or more of an alphanumeric string and an identified user group associated with the at least one user;
wherein one or more of the first policy rules and the second policy rules comprise a respective time-based rule;
wherein the one or more second policy rules requirements comprise policy rules based on second identity domain requirements,
the method further comprising:
ensuring suitability of the requested changes to the at least one of the first identity data and the first identity metadata with respect to the second identity domain by confirming the requested changes meet the one or more second credentials requirements, second attributes requirements, and second policy rules requirements.

19. The computer-readable storage medium of claim 17, wherein the method further comprises transmitting a request to the first identity domain to reverse the changes to the at least one of the first identity data and the first identity metadata, wherein the request to reverse the changes is based at least in part on the compatibility evaluation by the synchronizing agent.

20. The computer-readable storage medium of claim 17, wherein the method further comprises denying application of the request to change the at least one of the first identity data and the first identity metadata for the at least one user based in part on the compatibility evaluation by the synchronizing agent.

* * * * *